(12) United States Patent
Baskar et al.

(10) Patent No.: US 8,578,615 B2
(45) Date of Patent: Nov. 12, 2013

(54) JIGSAW WITH DEPLOYABLE KEEL AND TILTABLE SHOE

(75) Inventors: Ashok Samuel Baskar, Lutherville, MD (US); Steven McClaskey, North Las Vegas, NV (US); Frank A. DeSantis, Bel Air, MD (US); Zhang Haitao, Suzhou Industrial Park (CN)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 13/230,339

(22) Filed: Sep. 12, 2011

(65) Prior Publication Data
US 2013/0061480 A1 Mar. 14, 2013

(51) Int. Cl.
*B23D 49/00* (2006.01)

(52) U.S. Cl.
USPC .............................................. 30/376; 30/392

(58) Field of Classification Search
USPC ................ 30/371, 374–377, 392–394; D8/64
See application file for complete search history.

(56) References Cited

U.S. PATENT DOCUMENTS

| | | | |
|---|---|---|---|
| 1,102,018 A | 6/1914 | Dodds |
| 2,377,673 A | 6/1945 | Chaddock |
| 2,492,156 A | 12/1949 | Kupjack |
| 2,623,557 A | 12/1952 | Kendall |
| 2,749,951 A | 6/1956 | Tetzner |
| 2,775,272 A | 12/1956 | Papworth |
| 2,819,742 A | 1/1958 | Blachly |
| 2,916,062 A | 12/1959 | Clauson |
| 2,934,106 A | 4/1960 | Chapman et al. |
| 3,087,519 A | 4/1963 | McCarty et al. |
| 3,093,773 A | 6/1963 | Cole |
| 3,109,465 A | 11/1963 | Smith |
| 3,116,768 A | 1/1964 | Lasar |
| 3,131,736 A | 5/1964 | Ristow et al. |
| 3,146,809 A | 9/1964 | Botefuhr |

(Continued)

FOREIGN PATENT DOCUMENTS

| | | |
|---|---|---|
| CN | 102990156 A * | 3/2013 |
| DE | 1628899 A1 | 8/1971 |

(Continued)

OTHER PUBLICATIONS

Communication from the European Patent Office dated Aug. 9, 2011 regarding European Application No. 08164641.6.

(Continued)

*Primary Examiner* — Jason Daniel Prone
(74) *Attorney, Agent, or Firm* — Harness, Dickey & Pierce, P.L.C.

(57) ABSTRACT

A jigsaw may include a housing, a control member, a shoe member and a keel. The housing contains a motor and include a handle. The control member is moveable relative to the housing between at least a first position that implements a curve-cutting mode and a second position that implements a straight-cutting mode. The shoe member is connected to the housing and includes a bottom surface facing away from the housing. The keel is operable in a deployed configuration in which the keel protrudes through the bottom surface of the shoe member and a stowed configuration in which the keel does not protrude through the bottom surface of the shoe member. Relative motion between the shoe and the keel allows the keel to be in the deployed configuration when the control member is in the second position and the stowed configuration when the control member is in the first position.

16 Claims, 18 Drawing Sheets

(56) References Cited

U.S. PATENT DOCUMENTS

| | | |
|---|---|---|
| 3,353,573 A | 11/1967 | Hitzeroth |
| 3,374,814 A | 3/1968 | Kaufmann |
| 3,388,728 A | 6/1968 | Riley, Jr. et al. |
| 3,456,698 A | 7/1969 | Csaki |
| 3,457,796 A | 7/1969 | Leach et al. |
| 3,461,732 A | 8/1969 | Gregory |
| 3,478,786 A | 11/1969 | Hendrickson |
| 3,486,610 A | 12/1969 | Hain et al. |
| 3,542,097 A | 11/1970 | Dudek et al. |
| 3,805,383 A | 4/1974 | McNally |
| 3,834,019 A | 9/1974 | Smeltzer et al. |
| 3,938,251 A | 2/1976 | Kareman |
| 3,969,796 A | 7/1976 | Hodsdon et al. |
| 3,973,324 A | 8/1976 | Persson |
| 4,090,297 A | 5/1978 | Wanner et al. |
| 4,137,632 A | 2/1979 | Pfanzer |
| 4,191,917 A | 3/1980 | Brown et al. |
| 4,213,242 A | 7/1980 | Partington |
| 4,238,884 A | 12/1980 | Walton, II |
| 4,240,204 A | 12/1980 | Walton, II et al. |
| 4,250,624 A | 2/1981 | Partington |
| 4,255,006 A | 3/1981 | King |
| 4,255,858 A | 3/1981 | Getts |
| 4,257,297 A | 3/1981 | Nidbella |
| 4,262,421 A | 4/1981 | Bergler et al. |
| 4,272,889 A | 6/1981 | Scott et al. |
| 4,283,855 A | 8/1981 | Nalley |
| 4,351,112 A | 9/1982 | Nalley |
| 4,377,003 A | 3/1983 | Abe et al. |
| 4,545,123 A | 10/1985 | Hartmann |
| 4,614,037 A | 9/1986 | Somers |
| 4,628,459 A | 12/1986 | Shinohara et al. |
| 4,628,605 A | 12/1986 | Clowers |
| 4,636,961 A | 1/1987 | Bauer |
| 4,665,617 A | 5/1987 | Maier et al. |
| 4,675,999 A | 6/1987 | Ito et al. |
| 4,693,009 A | 9/1987 | Bone |
| 4,730,397 A | 3/1988 | Weiford et al. |
| 4,833,782 A | 5/1989 | Smith |
| 4,837,935 A | 6/1989 | Maier et al. |
| 4,932,294 A | 6/1990 | Chang |
| 4,962,681 A | 10/1990 | Yang |
| 4,969,830 A | 11/1990 | Daly et al. |
| 4,973,205 A | 11/1990 | Spaulding |
| 5,010,652 A | 4/1991 | Miletich |
| 5,012,583 A | 5/1991 | Blochle et al. |
| 5,038,481 A | 8/1991 | Smith |
| 5,119,705 A | 6/1992 | Rosenberger et al. |
| 5,205,043 A | 4/1993 | Batt et al. |
| 5,208,525 A | 5/1993 | Lopic et al. |
| 5,273,462 A | 12/1993 | Huser et al. |
| 5,279,037 A | 1/1994 | Leatherman |
| 5,445,479 A | 8/1995 | Hillinger |
| 5,535,437 A | 7/1996 | Karl et al. |
| 5,549,145 A | 8/1996 | Bearden |
| 5,617,638 A | 4/1997 | Amano et al. |
| 5,644,845 A | 7/1997 | Durr et al. |
| 5,644,846 A | 7/1997 | Durr et al. |
| 5,644,847 A | 7/1997 | Odendahl et al. |
| 5,675,899 A | 10/1997 | Webb |
| 5,680,704 A | 10/1997 | Okubo et al. |
| 5,716,730 A | 2/1998 | Deguchi |
| 5,727,322 A | 3/1998 | Giacometti |
| 5,778,538 A | 7/1998 | Gentinetta et al. |
| 5,784,800 A | 7/1998 | Santhouse et al. |
| 5,813,805 A | 9/1998 | Kopras |
| 5,902,080 A | 5/1999 | Kopras |
| 5,996,460 A | 12/1999 | Waite |
| 6,017,242 A | 1/2000 | Kerrigan |
| 6,021,826 A | 2/2000 | Daniell |
| 6,157,545 A | 12/2000 | Janninck et al. |
| 6,178,646 B1 | 1/2001 | Schnell et al. |
| 6,189,217 B1 | 2/2001 | Melvin et al. |
| D440,474 S | 4/2001 | Heun |
| 6,220,888 B1 | 4/2001 | Correa |
| 6,230,411 B1 | 5/2001 | Wall et al. |
| 6,305,089 B1 | 10/2001 | Berndt |
| 6,334,743 B1 | 1/2002 | Liao |
| 6,357,123 B1 | 3/2002 | Manuel |
| 6,357,124 B1 | 3/2002 | Wall et al. |
| 6,397,717 B1 | 6/2002 | Waite |
| 6,412,181 B1 | 7/2002 | Pracas |
| 6,443,675 B1 | 9/2002 | Kopras et al. |
| 6,449,851 B1 | 9/2002 | Bone et al. |
| D463,963 S | 10/2002 | Metaxatos et al. |
| 6,484,409 B2 | 11/2002 | Campbell et al. |
| 6,510,772 B2 | 1/2003 | Brickner, Jr. et al. |
| 6,553,642 B2 | 4/2003 | Driessen |
| 6,553,675 B2 | 4/2003 | Orrico |
| D474,384 S | 5/2003 | Andriolo |
| D476,871 S | 7/2003 | Santarsiero et al. |
| 6,625,892 B2 | 9/2003 | Takahashi et al. |
| 6,691,417 B2 | 2/2004 | Campbell et al. |
| 6,705,017 B2 | 3/2004 | Ellis et al. |
| 6,755,107 B2 | 6/2004 | Peot et al. |
| 6,769,188 B2 | 8/2004 | Dorner et al. |
| 6,877,234 B2 | 4/2005 | Saegesser et al. |
| 6,890,135 B2 | 5/2005 | Kopras et al. |
| 6,892,459 B2 | 5/2005 | Okumura et al. |
| 6,902,356 B2 | 6/2005 | Breitenmoser |
| 6,912,788 B2 | 7/2005 | Tam et al. |
| 6,920,694 B2 | 7/2005 | Hecht et al. |
| D519,014 S | 4/2006 | Aglassinger |
| D519,805 S | 5/2006 | Ng |
| D519,806 S | 5/2006 | Waldron |
| D520,318 S | 5/2006 | Waldron |
| D521,834 S | 5/2006 | Andriolo et al. |
| D522,335 S | 6/2006 | Houghton |
| 7,065,884 B2 | 6/2006 | Tam et al. |
| D524,622 S | 7/2006 | Corcoran |
| 7,094,011 B2 | 8/2006 | Kopras et al. |
| 7,111,405 B2 | 9/2006 | Delfini et al. |
| D532,664 S | 11/2006 | Wu |
| 7,131,180 B2 | 11/2006 | Kopras et al. |
| 7,131,206 B2 | 11/2006 | Wu |
| 7,152,329 B2 | 12/2006 | Kondo et al. |
| 7,234,243 B2 | 6/2007 | Tam et al. |
| 7,328,514 B2 | 2/2008 | Park |
| 7,503,121 B2 | 3/2009 | Powell et al. |
| 7,509,744 B2 | 3/2009 | Walker |
| 7,513,047 B2 | 4/2009 | Wu |
| 7,526,867 B2 | 5/2009 | Park |
| 7,562,457 B2 | 7/2009 | Prieto |
| 8,033,026 B2 * | 10/2011 | Gibbons et al. ................. 30/392 |
| 2002/0131267 A1 | 9/2002 | Van Osenbruggen |
| 2002/0197123 A1 | 12/2002 | Kopras et al. |
| 2003/0000355 A1 | 1/2003 | Butler et al. |
| 2003/0121389 A1 | 7/2003 | Wheeler et al. |
| 2003/0145472 A1 | 8/2003 | Swift |
| 2003/0196338 A1 | 10/2003 | Eto et al. |
| 2003/0233921 A1 | 12/2003 | Garcia et al. |
| 2004/0040161 A1 | 3/2004 | Houben et al. |
| 2004/0049927 A1 | 3/2004 | Wu |
| 2004/0112187 A1 | 6/2004 | Chen |
| 2004/0128843 A1 | 7/2004 | Walker |
| 2004/0168561 A1 | 9/2004 | Tam et al. |
| 2004/0261274 A1 | 12/2004 | Tam et al. |
| 2005/0060896 A1 | 3/2005 | Park |
| 2005/0195592 A1 | 9/2005 | Hsu et al. |
| 2005/0217448 A1 | 10/2005 | Walker |
| 2005/0223571 A1 | 10/2005 | Park et al. |
| 2005/0229408 A1 | 10/2005 | Ngan et al. |
| 2005/0252007 A1 | 11/2005 | Critelli et al. |
| 2005/0257383 A1 | 11/2005 | Million |
| 2005/0257384 A1 | 11/2005 | Million |
| 2005/0257385 A1 | 11/2005 | Walker |
| 2005/0262707 A1 | 12/2005 | Wu |
| 2005/0283984 A1 | 12/2005 | Walmsley |
| 2006/0064882 A1 | 3/2006 | Wilson et al. |
| 2006/0080850 A1 | 4/2006 | Firth |
| 2006/0090355 A1 | 5/2006 | Di Nicolantonio |
| 2006/0101969 A1 | 5/2006 | Garcia et al. |
| 2006/0104732 A1 | 5/2006 | Huang |
| 2006/0117580 A1 | 6/2006 | Serdynski et al. |

(56) References Cited

U.S. PATENT DOCUMENTS

| | | | |
|---|---|---|---|
| 2006/0143928 A1 | 7/2006 | Wu | |
| 2006/0168824 A1 | 8/2006 | Roberts | |
| 2006/0185173 A1 | 8/2006 | Wadge et al. | |
| 2006/0191140 A1 | 8/2006 | Wadge et al. | |
| 2006/0196059 A1 | 9/2006 | Berto | |
| 2006/0288592 A1 | 12/2006 | Roberts | |
| 2007/0059114 A1 | 3/2007 | Grimes | |
| 2007/0068012 A1 | 3/2007 | Chen | |
| 2007/0101586 A1 | 5/2007 | Felder et al. | |
| 2007/0180711 A1 | 8/2007 | Park | |
| 2007/0186425 A1 | 8/2007 | Tam et al. | |
| 2008/0222901 A1 | 9/2008 | Kaiser et al. | |
| 2008/0229589 A1 | 9/2008 | Bone | |
| 2008/0244910 A1 | 10/2008 | Patel | |
| 2008/0244916 A1 | 10/2008 | Felder | |
| 2009/0077814 A1* | 3/2009 | Gibbons et al. | 30/376 |
| 2009/0077816 A1* | 3/2009 | Gibbons et al. | 30/392 |
| 2009/0077817 A1* | 3/2009 | Gibbons et al. | 30/392 |
| 2009/0077818 A1* | 3/2009 | Van Wambeke et al. | 30/392 |
| 2009/0077819 A1* | 3/2009 | Kuehne et al. | 30/392 |
| 2009/0077820 A1* | 3/2009 | Gibbons et al. | 30/393 |
| 2009/0313831 A1 | 12/2009 | Patel | |
| 2012/0000053 A1* | 1/2012 | Gibbons et al. | 29/428 |
| 2012/0174418 A1* | 7/2012 | Kuehne | 30/376 |
| 2012/0317823 A1* | 12/2012 | Vantran et al. | 30/376 |

FOREIGN PATENT DOCUMENTS

| | | |
|---|---|---|
| DE | 2303532 A1 | 8/1974 |
| DE | 2435845 A1 | 2/1976 |
| DE | 2650470 A1 | 5/1978 |
| DE | 8033115 U1 | 5/1981 |
| DE | 3021801 A1 | 12/1981 |
| DE | 3118758 A1 | 12/1982 |
| DE | 3222426 C1 | 12/1983 |
| DE | 3403762 A1 | 8/1985 |
| DE | 3408847 A1 | 11/1985 |
| DE | 3446278 A1 | 6/1986 |
| DE | 3543764 A1 | 6/1986 |
| DE | 3509515 A1 | 9/1986 |
| DE | 8507818 U1 | 2/1987 |
| DE | 3608301 A1 | 9/1987 |
| DE | 8808046 U1 | 9/1988 |
| DE | 3546700 C2 | 10/1990 |
| DE | 3921891 A1 | 1/1991 |
| DE | 4027135 A1 | 3/1992 |
| DE | 9307337 U1 | 7/1993 |
| DE | 9313712 U1 | 12/1993 |
| DE | 4320233 C1 | 6/1994 |
| DE | 4316155 A1 | 11/1994 |
| DE | 19513078 A1 | 10/1996 |
| DE | 19604938 A1 | 2/1997 |
| DE | 29615634 U1 | 2/1997 |
| DE | 19609388 A1 | 9/1997 |
| DE | 29910173 U1 | 9/1999 |
| DE | 19926387 A1 | 12/2000 |
| DE | 20120529 U1 | 3/2002 |
| DE | 10215871 C1 | 10/2003 |
| DE | 20220893 U1 | 6/2004 |
| DE | 102004043564 A1 | 3/2006 |
| DE | 102004051350 B3 | 4/2006 |
| DE | 202006004715 U1 | 6/2006 |
| DE | 102005025934 A1 | 12/2006 |
| EP | 0347631 A2 | 12/1989 |
| EP | 0504745 A1 | 9/1992 |
| EP | 0521263 A1 | 1/1993 |
| EP | 0603552 A1 | 6/1994 |
| EP | 0716897 A1 | 6/1996 |
| EP | 0716898 A1 | 6/1996 |
| EP | 0736353 A1 | 10/1996 |
| EP | 0826453 A1 | 3/1998 |
| EP | 0967040 A1 | 12/1999 |
| EP | 0970771 A2 | 1/2000 |
| EP | 1188505 A2 | 3/2002 |
| EP | 1258305 A2 | 11/2002 |
| EP | 1586399 A1 | 10/2005 |
| EP | 1658936 A1 | 5/2006 |
| EP | 1679144 A1 | 7/2006 |
| EP | 1437203 B1 | 12/2006 |
| EP | 1595631 B1 | 2/2007 |
| EP | 2039451 A2 * | 3/2009 |
| EP | 2039452 A2 * | 3/2009 |
| EP | 2039453 A2 * | 3/2009 |
| EP | 2039454 A2 * | 3/2009 |
| EP | 2039455 A2 * | 3/2009 |
| EP | 2106871 A2 | 10/2009 |
| EP | 2567769 A1 * | 3/2013 |
| FR | 2528753 A1 | 12/1983 |
| FR | 2795990 A1 | 1/2001 |
| GB | 221671 A | 9/1924 |
| GB | 2075421 A | 11/1981 |
| GB | 2299539 A | 10/1996 |
| GB | 2300145 A | 10/1996 |
| GB | 2310905 A | 9/1997 |
| GB | 2330328 A | 4/1999 |
| GB | 2336805 | 11/1999 |
| GB | 2337228 A | 11/1999 |
| GB | 2399314 A | 9/2004 |
| GB | 2399315 A | 9/2004 |
| GB | 2406071 A | 3/2005 |
| GB | 2417008 A | 2/2006 |
| JP | 04269117 A | 9/1992 |
| JP | 2000343309 A | 12/2000 |
| JP | 2002337102 A | 11/2002 |
| WO | WO-8605427 A1 | 9/1986 |
| WO | WO-0222297 A1 | 3/2002 |
| WO | WO-02057042 A1 | 7/2002 |
| WO | WO-03106087 A1 | 12/2003 |

OTHER PUBLICATIONS

Extended European Search Report regarding Application No. 12183933.6 dated Feb. 8, 2013.

* cited by examiner

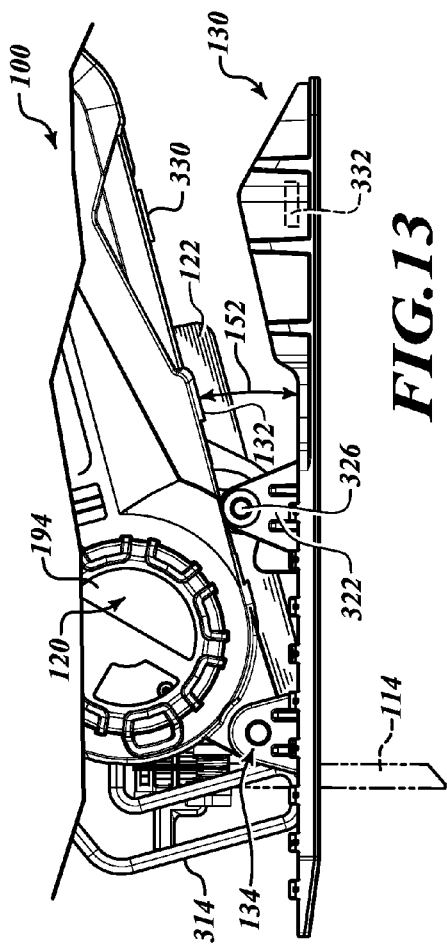
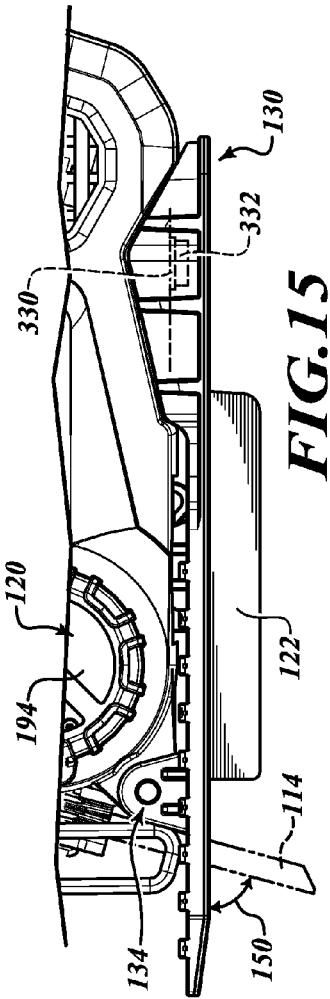
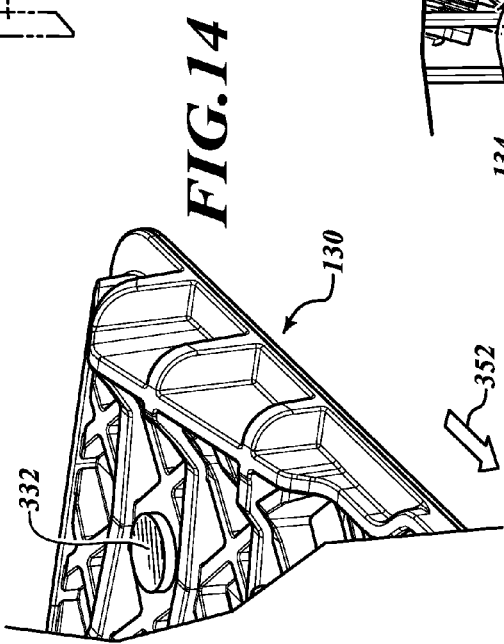

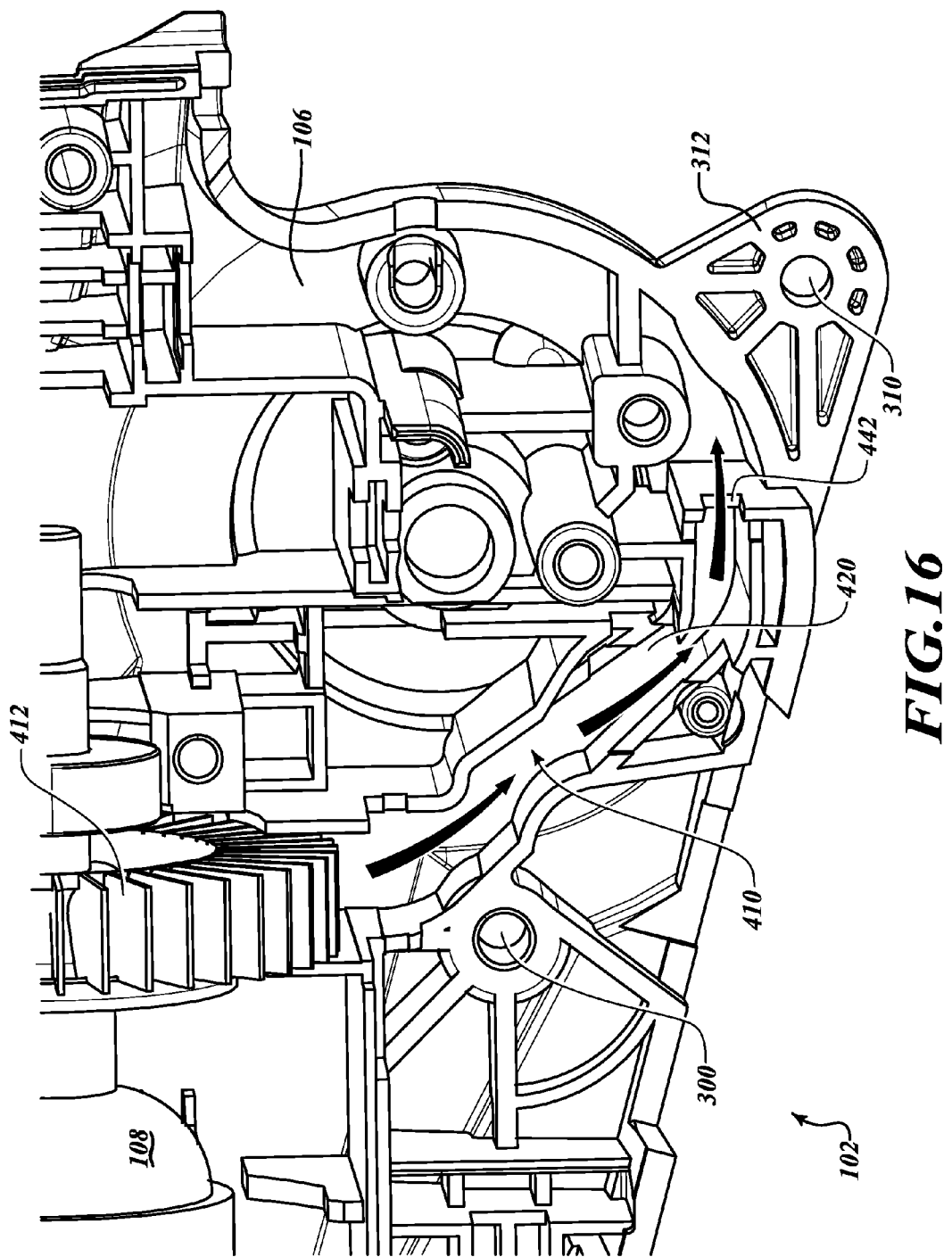

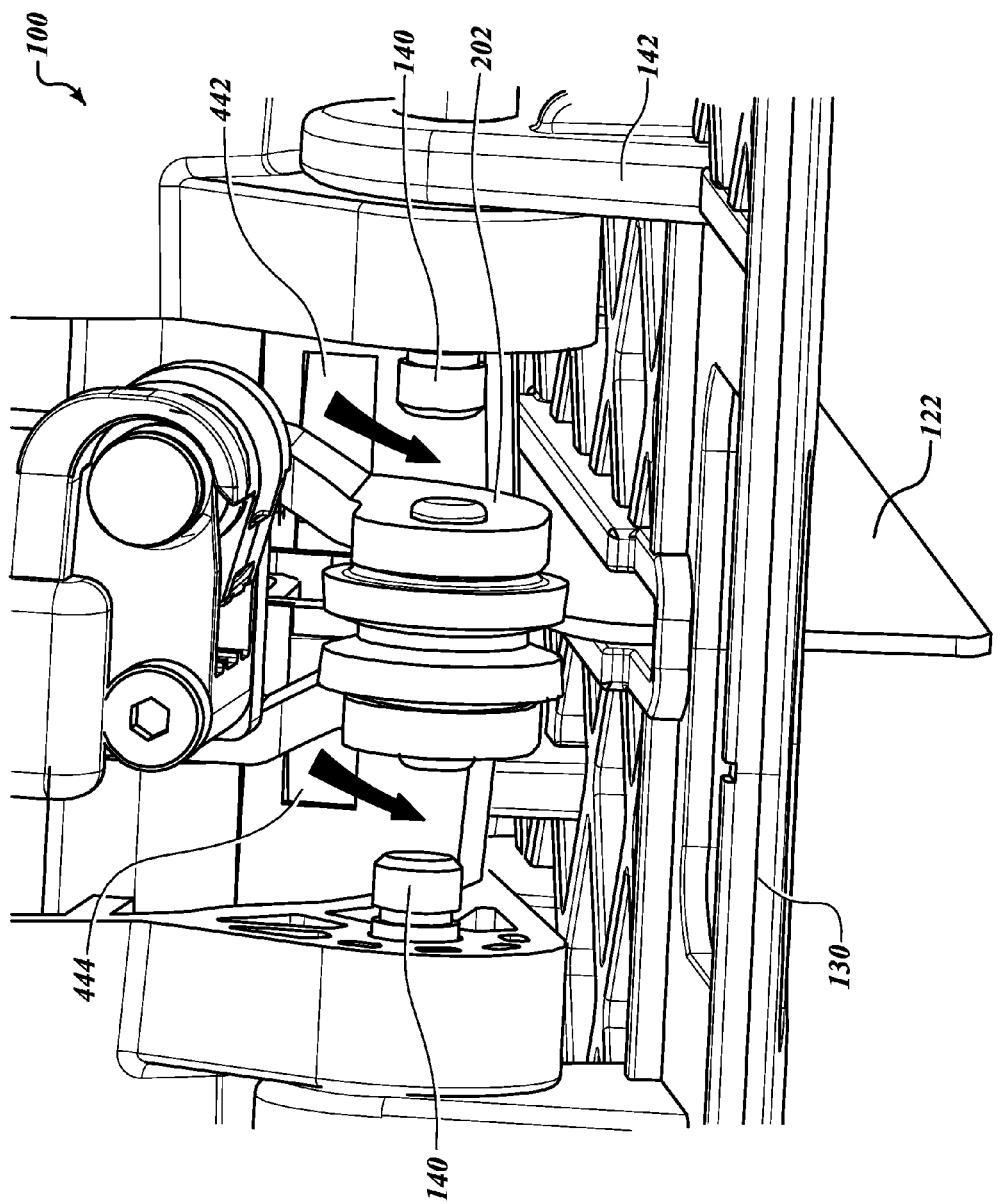

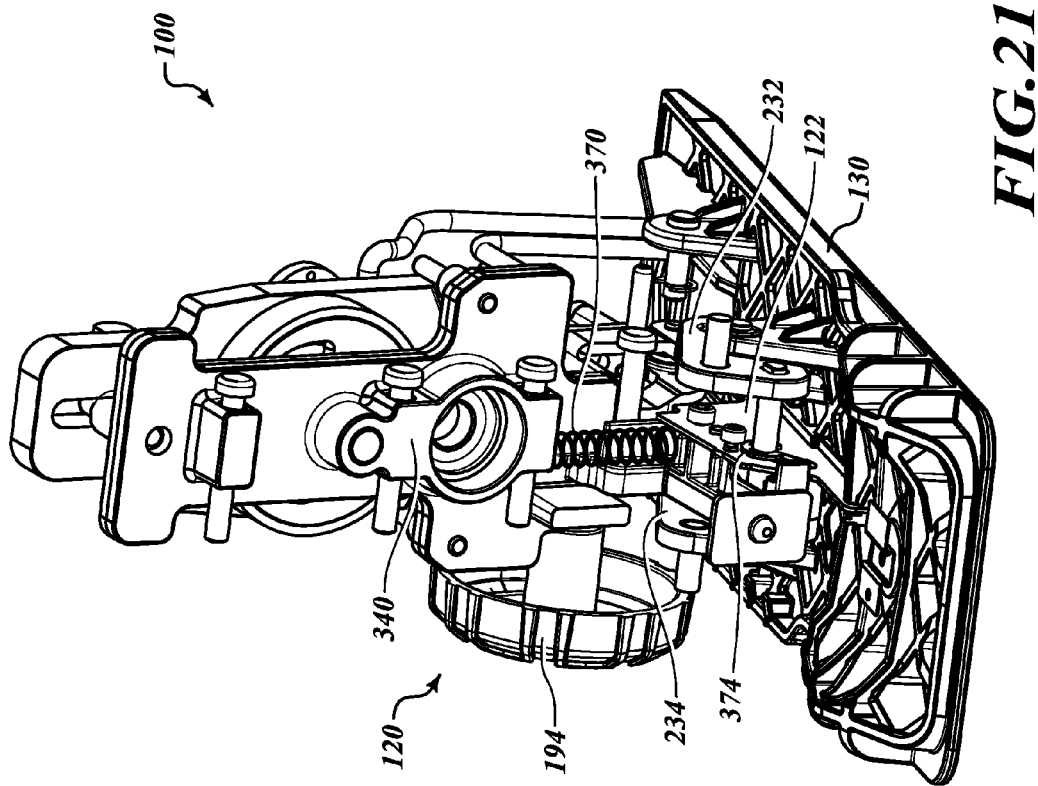

JIGSAW WITH DEPLOYABLE KEEL AND TILTABLE SHOE

FIELD

The present teachings relate to jigsaw and more particularly to deployment of a keel in combination with imparting of orbital motion to a cutting blade with a single control member.

BACKGROUND

This section provides background information related to the present disclosure and is not necessarily prior art.

Jigsaws are typically used to cut curved lines in workpieces, but are less adept at cutting straight-lines. Use of a keel in jigsaws may improve their straight-line cutting ability. When cutting a straight-line, a user may employ a faster blade speed than when cutting curved lines.

SUMMARY

This section provides a general summary of the disclosure, and is not a comprehensive disclosure of its full scope or all of its features.

The present disclosure provides a jigsaw that may include a housing, a control member, a shoe member and a keel. The housing may contain a motor and include a handle. The control member may be supported by the housing and may be moveable between at least a first position that implements a curve-cutting mode and a second position that implements a straight-cutting mode. The shoe member may be connected to the housing and may include a bottom surface facing away from the housing. The keel may be connected to the housing and may be operable in a deployed configuration in which the keel protrudes through the bottom surface of the shoe member and a stowed configuration in which the keel does not protrude through the bottom surface of the shoe member. Relative motion between the shoe and the keel may allow the keel to be in the deployed configuration when the control member is in the second position and the stowed configuration when the control member is in the first position.

The present disclosure also provides a jigsaw that may include a housing, a control member, a shoe member and a keel. The housing may contain a motor activated by a trigger assembly. The control member may be movably supported by the housing between at least a first position that implements a curve-cutting mode and a second position that implements a straight-cutting mode. The keel may be connected to the housing. The shoe member may be pivotally connected to the housing and movable relative to the housing between an extended position and a retracted position. The shoe member may include a bottom surface facing away from the housing and may define a channel through which the keel extends when the shoe member is in the retracted position. The keel may be stowed between the bottom surface and at least a portion of the housing when the shoe member is in the extended position.

The present disclosure also provides method of implementing a curved-cutting mode and a straight-cutting mode of a jigsaw. The jigsaw may include a housing, a control member, a shoe member, a keel member and a reciprocating shaft configured to engage a cutting blade. The method may include moving the control member relative to the housing to a first position to implement the straight-cutting mode. Moving the control member to the first position may move the shoe member toward the housing and into a retracted position, move the keel member into a deployed position whereby the keel member extends through the shoe member, and permit orbital motion of the reciprocating shaft. The method may also include moving the control member relative to the housing to a second position to implement the curved-cutting mode. Moving the control member to the second position may move the shoe member into an extended position relative to the housing, move the keel member into a stowed position, and inhibit orbital motion of the reciprocating shaft. In some embodiments, the keel member may be disposed entirely between the housing and the shoe member in the stowed position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected aspects of the present teachings and not all possible implementations, and are not intended to limit the scope of the present disclosure.

FIG. 13 is similar to FIG. 1 and shows a partial side view of a clip member attached to the housing of the jigsaw and a magnetic portion on the shoe member with the jigsaw in the curve-cutting mode in accordance with the present teachings.

FIG. 14 is a partial perspective view of the shoe member showing the magnetic portion in accordance with the present teachings.

FIG. 15 is similar to FIG. 13 and shows the clip member connected to the magnetic portion in the shoe member in the straight-cutting mode in accordance with the present teachings.

FIG. 16 is a partial perspective view of a housing half-shell showing an airflow direction from the fan out to the cutting area along the airflow pathway in accordance with the present teachings.

FIG. 17 is a partial perspective view showing outlets at the cutting area that direct the airflow from the airflow pathway in accordance with the present teachings.

FIG. 21 is a simplified rear perspective view showing the elastic member in engagement with the keel member in accordance with the present teachings.

Corresponding reference numerals indicate corresponding parts throughout the several views of the drawings.

DETAILED DESCRIPTION

Example aspects of the present teachings will now be described more fully with reference to the accompanying drawings.

Figure 1:
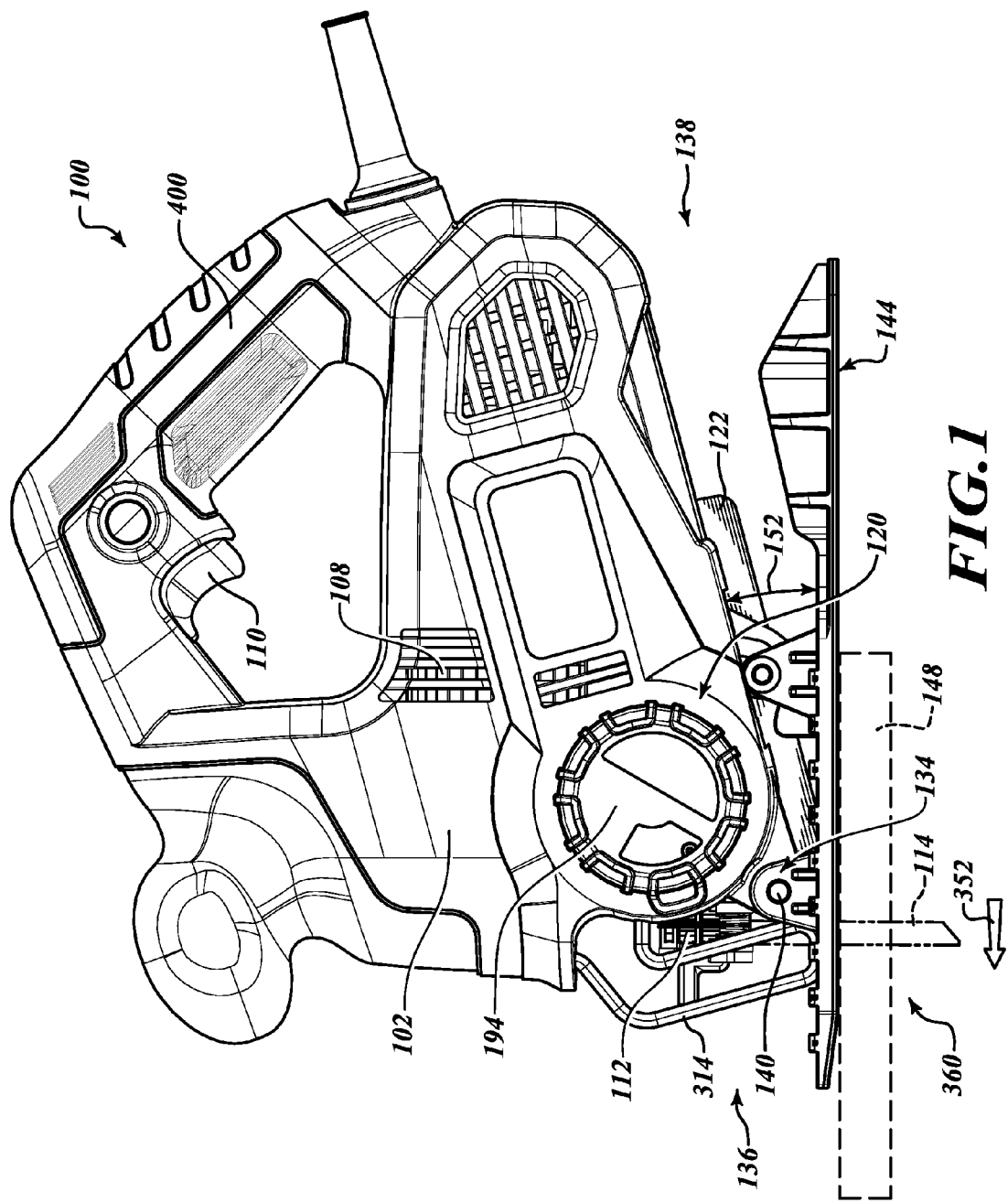
FIG. 1 is a side view of a jigsaw in a curve-cutting mode with a shoe member tilted away from a housing of the jigsaw in accordance with the present teachings.
Figure 2:
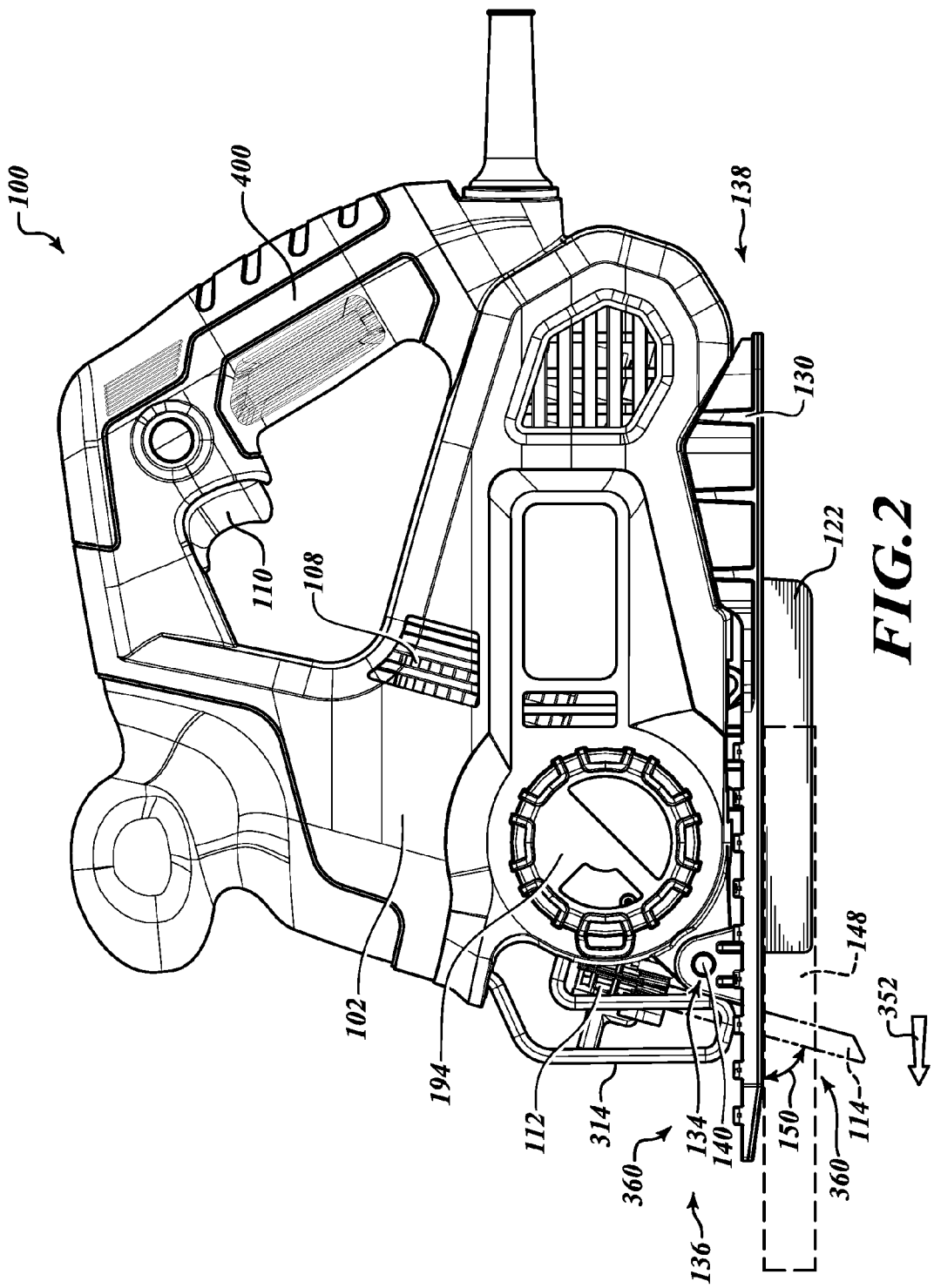
FIG. 2 is similar to FIG. 1 and shows the jigsaw in a straight-cutting mode with a keel deployed beneath the shoe member in accordance with the present teachings.
Figure 11:
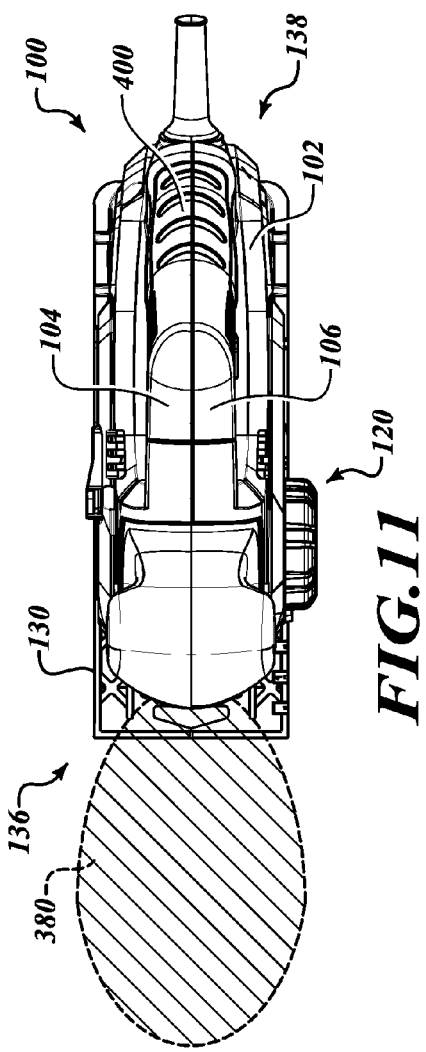
FIG. 11 is a top view of the jigsaw of FIG. 1 showing a wide-area illumination pattern in accordance with the present teachings.
Figure 12:
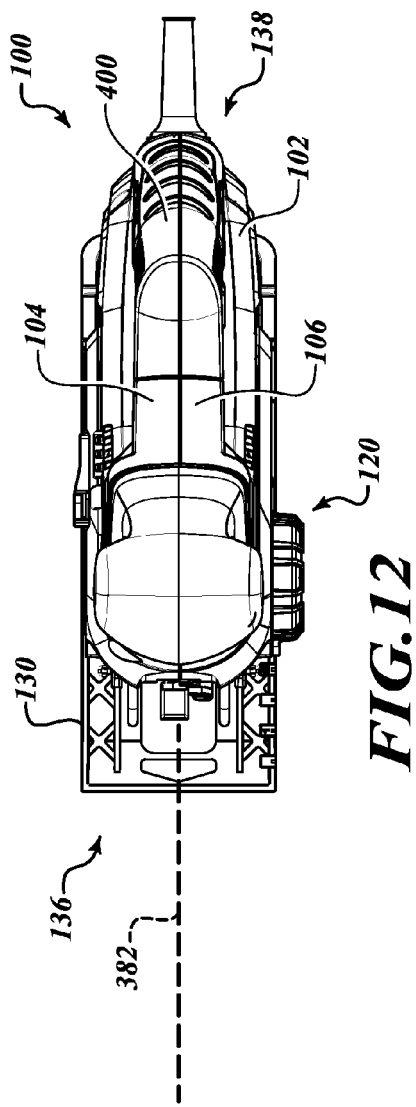
FIG. 12 is a top view of the jigsaw of FIG. 2 showing a straight-line illumination pattern for the straight-cutting mode in accordance with the present teachings.
Figure 18:
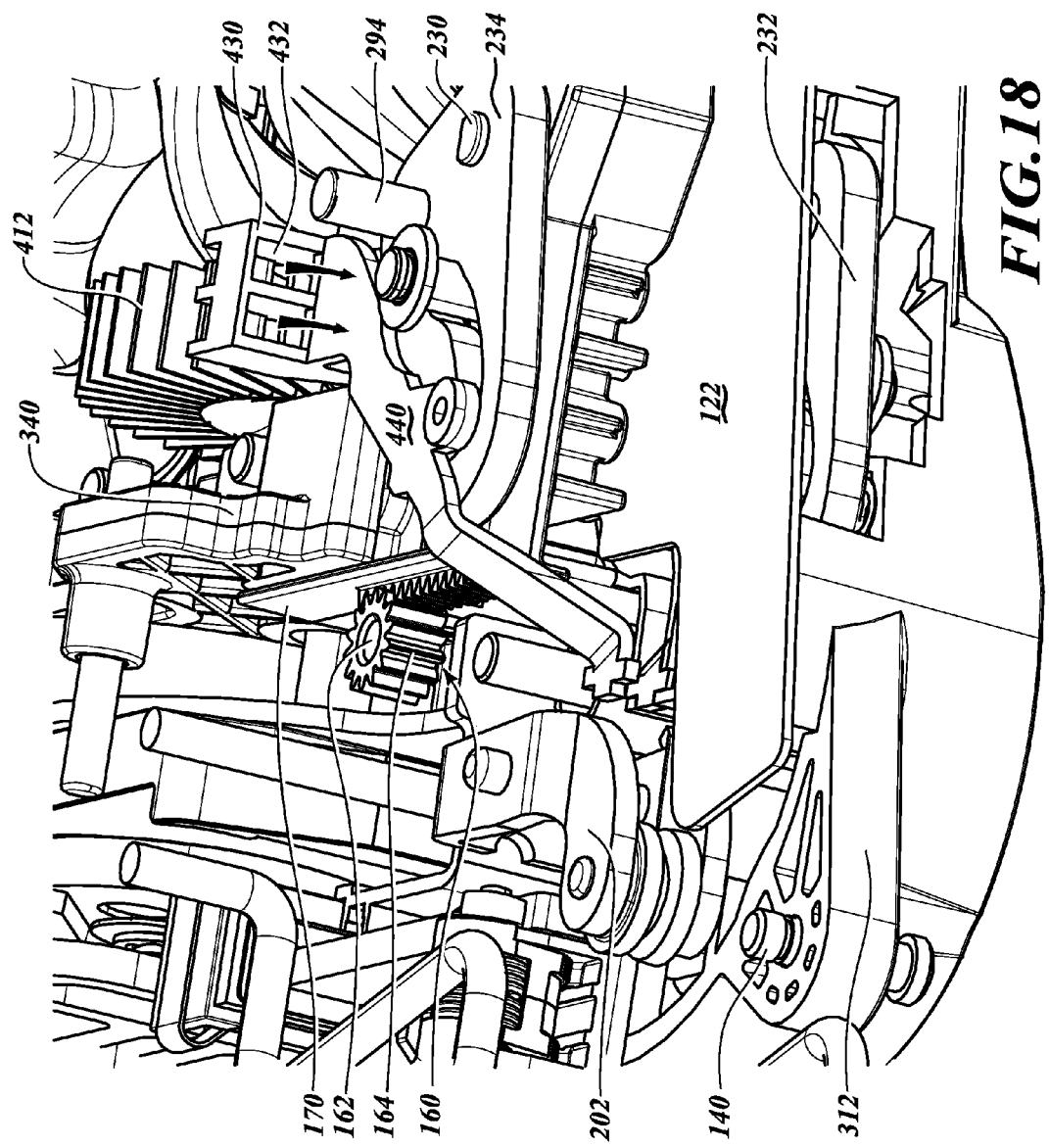
FIG. 18 is a partial perspective view showing an arm member that connects to a nozzle adjacent the fan that directs airflow through the airflow passageway in the housing toward the cutting area in accordance with the present teachings.
Figure 19:
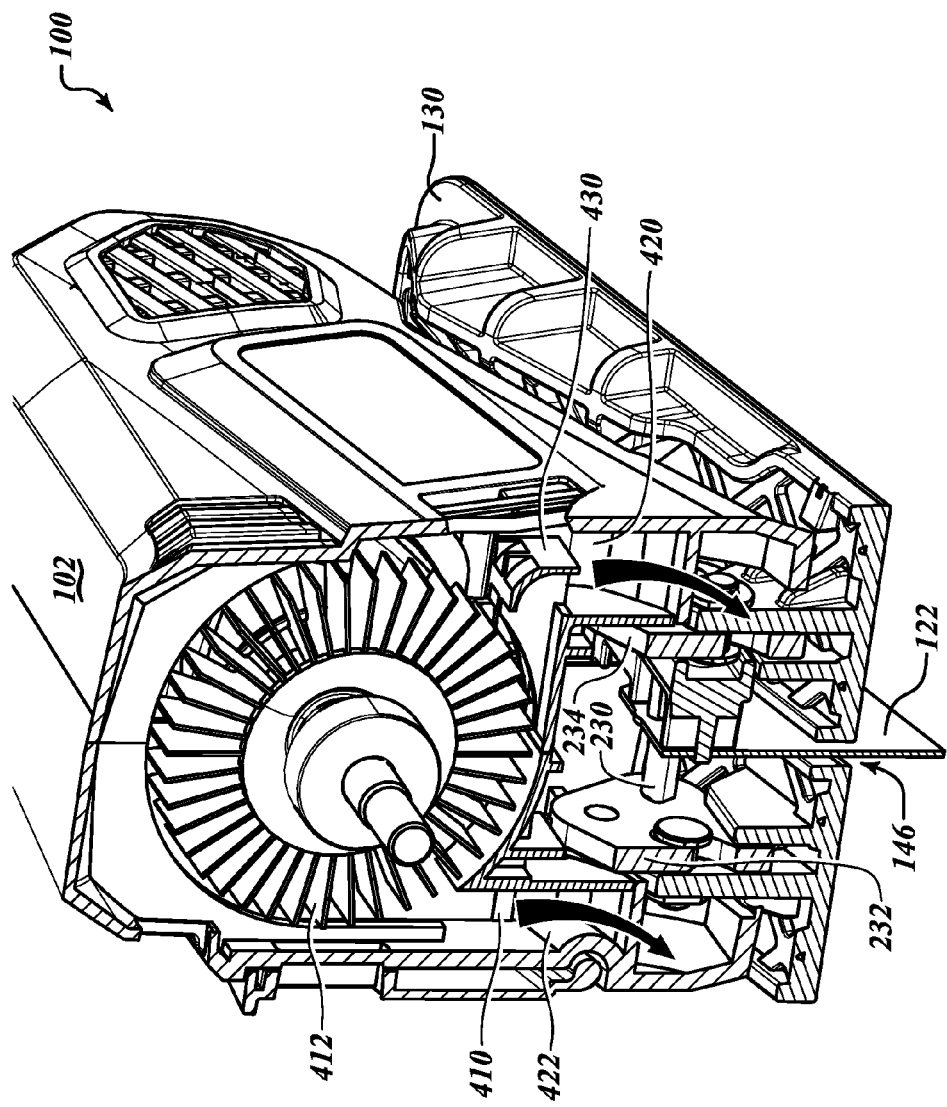
FIG. 19 is a diagram showing a partial cross-sectional view adjacent the fan showing the airflow pathway leading to the cutting area in accordance with the present teachings.

With reference to FIGS. 1 and 2, a jigsaw 100 generally includes a housing 102 that can be formed of two half-shells 104, 106 (FIGS. 11 and 12). The housing 102 can contain a motor 108 (FIG. 7), which when activated by a trigger assembly 110, can provide a reciprocating motion, an orbital motion or both to a reciprocating shaft 112 (FIG. 5) to drive a cutting blade 114. A user can use a single control member 120 on a side of the housing 102 to control implementation of orbital (pendulum) motion to the reciprocating shaft 112 and deployment of a keel 122 through movement of a shoe member 130. In this regard, the control member 120 can be moved between at least a curve-cutting position that implements a curve-cutting mode (FIGS. 1 and 11) and a straight-cutting position that implements a straight-cutting mode (FIGS. 2 and 12).

By moving the control member 120 to the curve-cutting position, the control member 120 can: (1) cause the shoe member 130 to move to an extended position, (2) cause the keel 122 to move to a stowed position, and (3) inhibit orbital motion of the reciprocating shaft 112. By moving the control member 120 to the straight-cutting position, the control member 120 can: (1) cause the shoe member 130 to move to a retracted position, (2) cause the keel 122 to move to a deployed position, and (3) permit orbital motion of the reciprocating shaft 112.

The movement of the shoe member 130 relative to the keel 122 and housing 102 will now be described. The shoe member 130 can pivot relative to the housing 102 about a pivot 134. The pivot 134 can be located toward a front end 136 of the shoe member 130 and, therefore, permit a rear end 138 of the shoe member 130 to pivot toward the housing 102 and into the retracted position (FIG. 2). The shoe member 130 can also pivot away from the housing 102 into the extended position (FIG. 1). The pivot 134 can take the form of pins 140 that can couple connectors 142 on the shoe member 130 to the housing 102.

When the keel 122 is in the deployed position (FIG. 2), the keel 122 can protrude from a bottom 144 of the shoe member 130. The shoe member 130 can define a channel 146 (FIG. 5) through which at least a portion of the keel 122 can extend. When the keel 122 is in the stowed position (FIG. 1), the shoe member 130 can be tilted away from the housing 102 into its extended position. When the keel 122 is in the stowed position, the keel 122 can remain entirely disposed between the shoe member 130 and the housing 102. In certain circumstances, the keel 122 can appear to be hidden from view when in the stowed position.

In the straight-cutting position, the reciprocating shaft 112 or the cutting blade 114 or both can form an acute angle 150 (FIG. 15) with the shoe member 130. In the curve-cutting mode, the shoe member 130 can form an acute angle 152 (FIG. 13) with a bottom 132 of the housing 102.

With reference to FIGS. 1 and 2, the bottom 144 of the shoe member 130 can abut one or more workpieces 148, which can be wood, plastic, metal, other suitable materials and one or more combinations thereof and can be in the form of pipe, sheet material, stock material, other suitable forms, and/or materials and one or more combinations thereof. When the keel 122 is in the deployed position, the keel 122 can engage one or more of the workpieces 148 and improve the straight-line cutting accuracy of the jigsaw 100. In this arrangement, the reciprocating shaft 112 and the cutting blade 114 can form the acute angle 150 with the workpiece 148 and the shoe member 130. In contrast, when the keel 122 is in the stowed position, the keel 122 makes no contact with the workpiece 148. Moreover, when the keel 122 is in the stowed position, the control member 120 can control the magnitude of orbital motion of the cutting blade 114 to be a value greater than zero.

Figure 3:
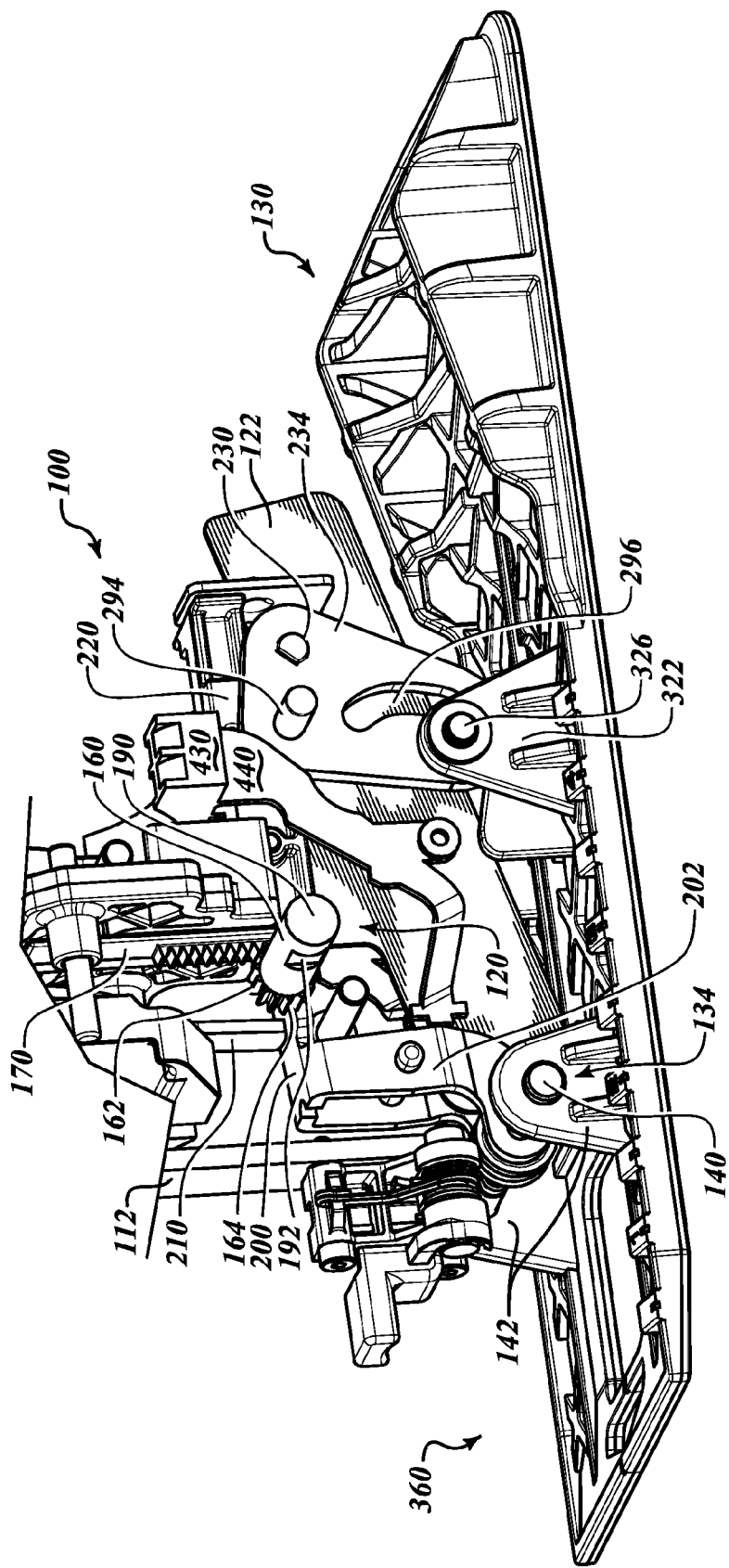
FIG. 3 is a partial perspective view of the jigsaw with its housing removed showing the shoe member and its connection to the housing of the jigsaw and a pinion on a shaft member that moves a rack member and its body portion to move the shoe member relative to the housing in accordance with the present teachings.

With reference to FIGS. 3-6, the control member 120 can include a shaft member 160 having a pinion 162 with a plurality of gear teeth 164 on its outer periphery. The pinion 162 can mesh with a rack member 170 to move the rack member 170 between a lowered position (FIG. 7) and a raised position (FIG. 3). The shaft member 160 can also have a first end 180 (FIG. 5) with an outer periphery. The outer periphery can include a circular contour interrupted by a flat surface 182.

With reference to FIG. 3, the shaft member 160 can also include a second end 190 opposite the first end 180. At the second end 190, the shaft member 160 can include a groove 192. The groove 192 can be operable to receive a knob, dial or handle 194 (FIGS. 1 and 2) that allows the user to rotate the shaft member 160. In some configurations, the handle 194 could be the only component of the control member 120 accessible to the user on the exterior of the housing 102. As such, the handle 194 is what the user can grasp to manipulate the single control member 120 between the curve-cutting and straight-cutting positions.

The handle 194 of the control member 120 can rotate the shaft member 160 to the straight-cutting position, which can expose the flat surface 182 to a flange 200 formed on a bell crank 202. In the straight-cutting position, the flat surface 182 can be spaced from the flange 200 so that the flange 200 engages a drive member 210 that can reciprocate with the reciprocating shaft 112. Such engagement between the drive member 210 and the flange 200 allows the drive member 210 to cyclically rock the bell crank 202 back and forth about a pivot pin 203. This cyclical rocking of the bell crank 202 allows a roller 205 to impart orbital motion to the blade 114.

The control member 120 can be rotated to the curve-cutting position so that the circular contour on the shaft member 160 can engage the flange 200 of the bell crank 202. With the circular contour engaging the flange 200, the bell crank 202 can be held away from contact with a driver member 210 (FIG. 5), thereby restricting or preventing the drive member 210 from rocking the bell crank 202 about the pivot pin 203, which in turn, restricts or prevents the bell crank 202 from imparting orbital motion onto the blade 114. In doing so, the magnitude of the orbital motion of the blade 114 can be reduced or eliminated, as described herein.

Figure 4:
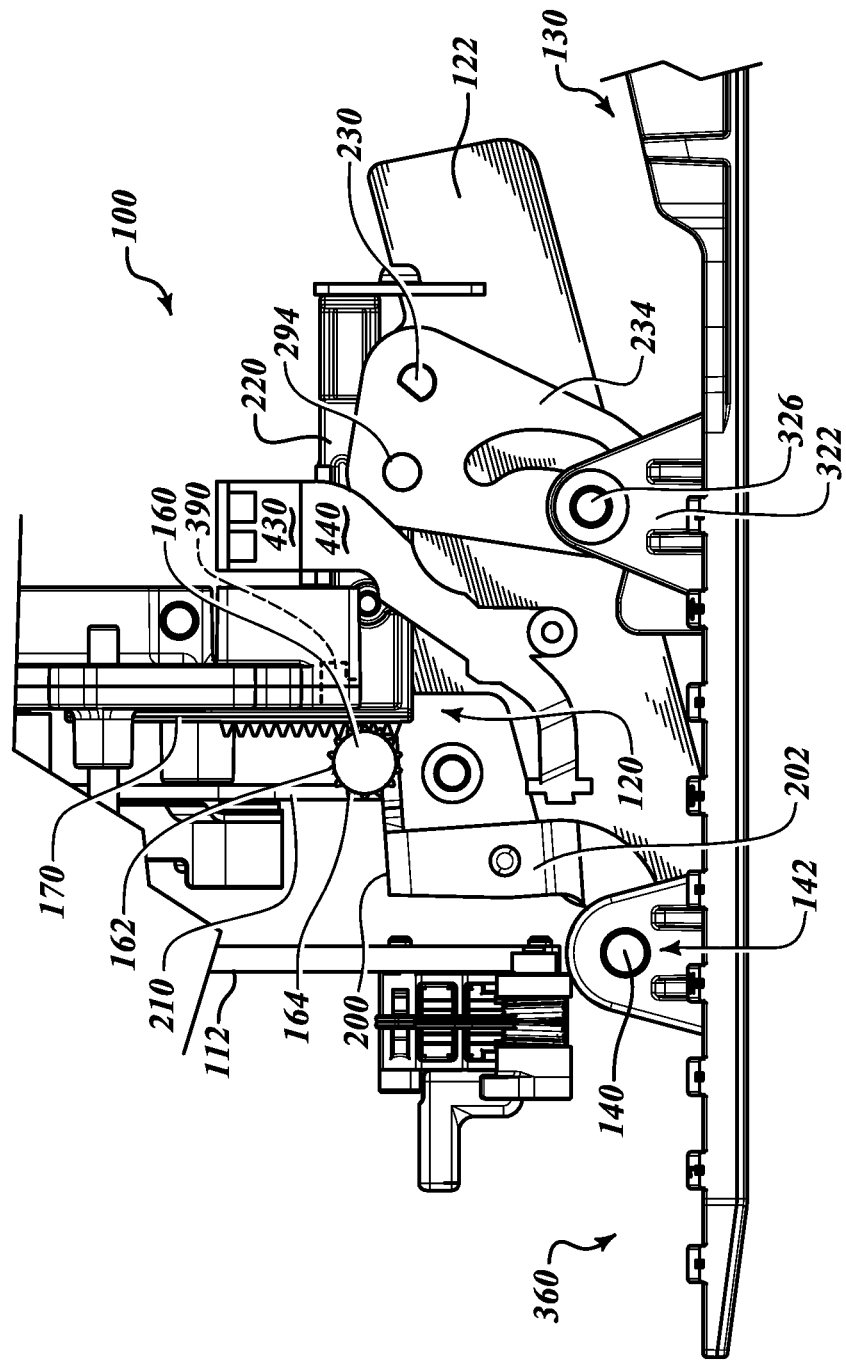
FIG. 4 is similar to FIG. 3 and shows a partial side view of the shoe member and its connection to the housing of the jigsaw showing the shoe member tilted away from the housing in its extended position in accordance with the present teachings.
Figure 5:
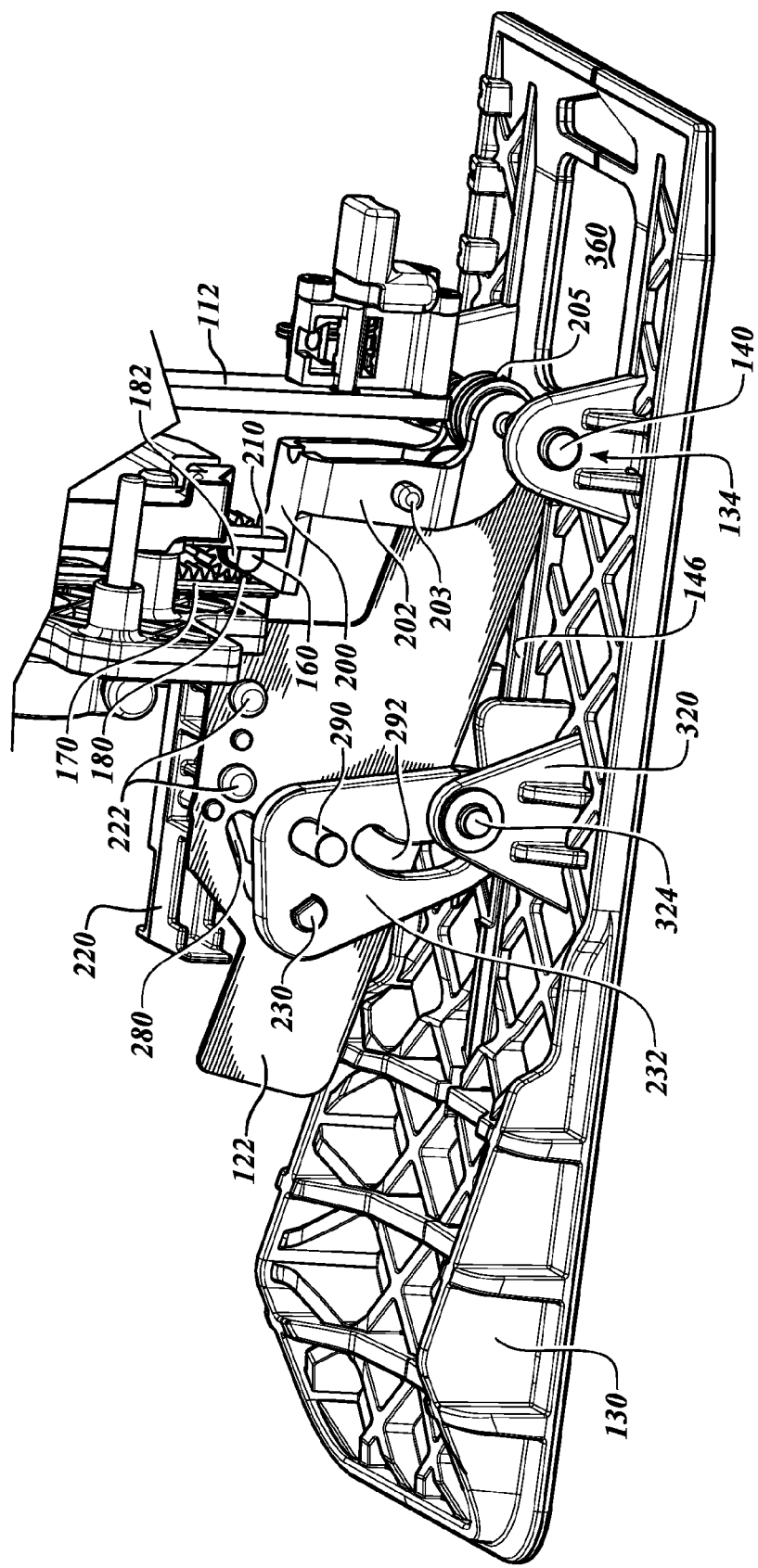
FIG. 5 is similar to FIG. 3 and shows a partial rear perspective view of the shoe member and its connection to the housing in the curve-cutting mode in accordance with the present teachings.
Figure 6:
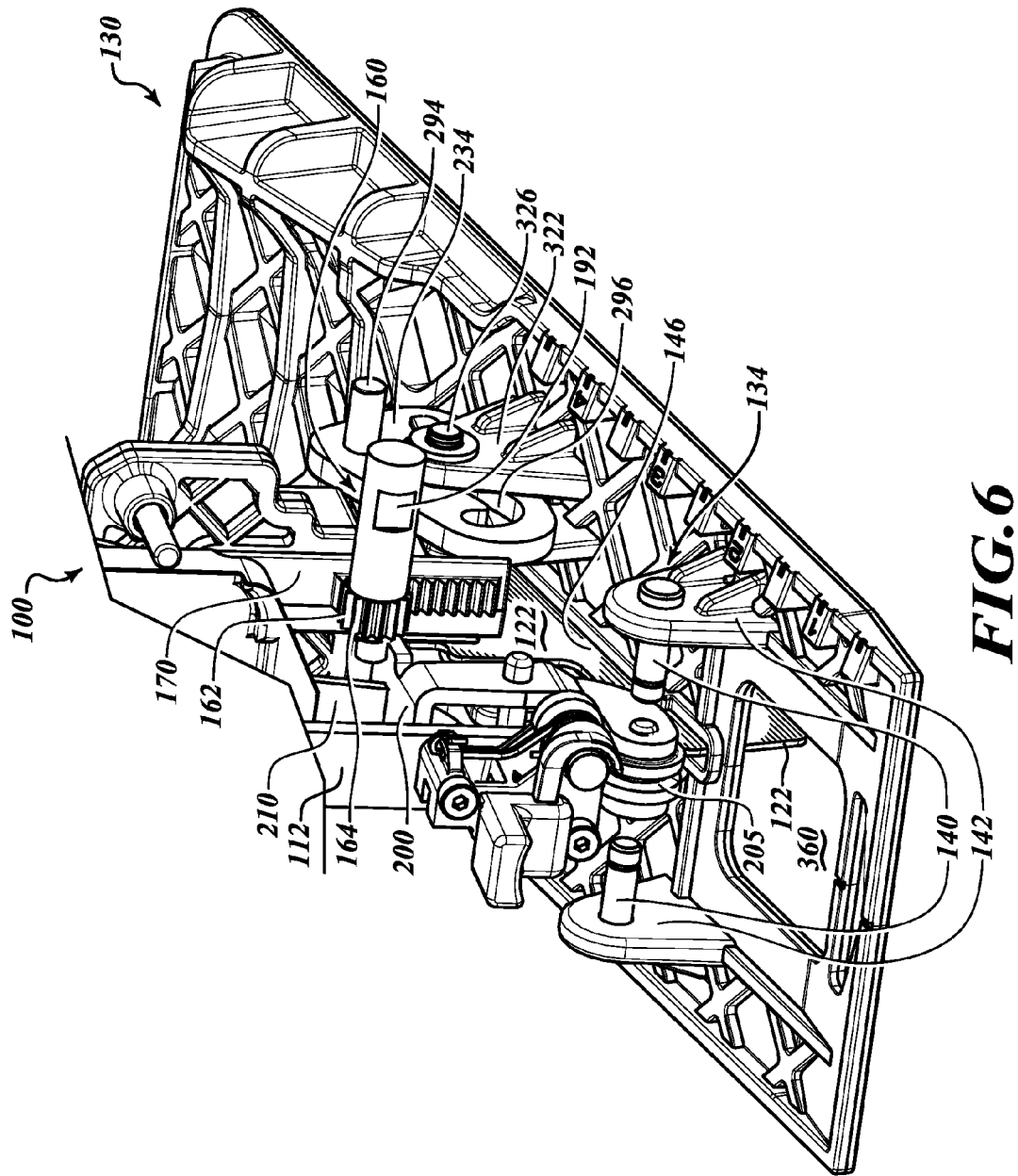
FIG. 6 is similar to FIG. 5 and shows the shoe member and its connection to the housing in the straight-cutting mode with the keel deployed to extend below the shoe member and the rack member in its extended position in accordance with the present teachings.

The pinion 162 on the shaft member 160 can rotate to move the rack member 170 from its lowered position (FIGS. 6 and 7) to its raised position (FIGS. 3, 4, and 5). With reference to FIGS. 3-8, a body portion 220 can extend from the rack member 170. The keel 122 can connect to the body portion 220 with two fasteners 222 (FIG. 5). In this manner, the keel 122 may be movable with the rack member 170 relative to housing 102. It will be appreciated that in some embodiments, the keel 122 could be fixed relative to the housing 102.

With reference to FIGS. 3, 8, 9, and 10, a pin member 230 can connect to a first cam member 232 and a second cam member 234. The pin member 230 can include a first peripheral zone 240, a second peripheral zone 242, and a third peripheral zone 244. The first peripheral zone 240 of the pin member 230 can include a flat surface 250 that can interrupt a circular contour 252 on its outer periphery. The second peripheral zone 242 can include a circular contour 254 around its entire outer periphery. The third peripheral zone 244 can include a flat surface 256 that interrupts a circular contour 258 on its outer periphery.

The first peripheral zone 240 of the pin member 230 can connect to an aperture 260 formed in the first cam member 232. The aperture 260 can have a flat surface 262 that can be complementary to the flat surface 250. The abutting flat surfaces 250 and 262 can be configured to restrict rotation of the pin member 230 when connected to the first cam member 232. The third peripheral zone 244 of the pin member 230 can connect to an aperture 270 formed in the second cam member 234. The aperture 270 can have a flat surface 272 that can be complementary to the flat surface 256. The abutting flat surfaces 256 and 270 can be configured to restrict rotation of the pin member 230 when connected to the second cam member 234. In this arrangement, the second peripheral zone 242 of the pin member 230 can move in a groove 280 (FIG. 5) formed in the keel 122 as the pin member 230 moves with the first and second cam members 232, 234.

The first cam member 232 can define a first post 290 and a first channel 292. The second cam member 234 can similarly define a second post 294 and a second channel 296. The first post 290 on the first cam member 232 and the second post 294 on the second cam member 234 can be secured to recesses (e.g.: a recess 300 in FIG. 9) on respective interior portions of the housing 102. The recesses in the housing 102 can permit the posts 290, 294 of the cam members 232, 234 to rotate relative to the housing 102 but can restrict the posts 290, 294 of the cam members 232, 234 from translating (i.e., up-down, side-to-side, etc.) within the housing 102.

Figure 9:
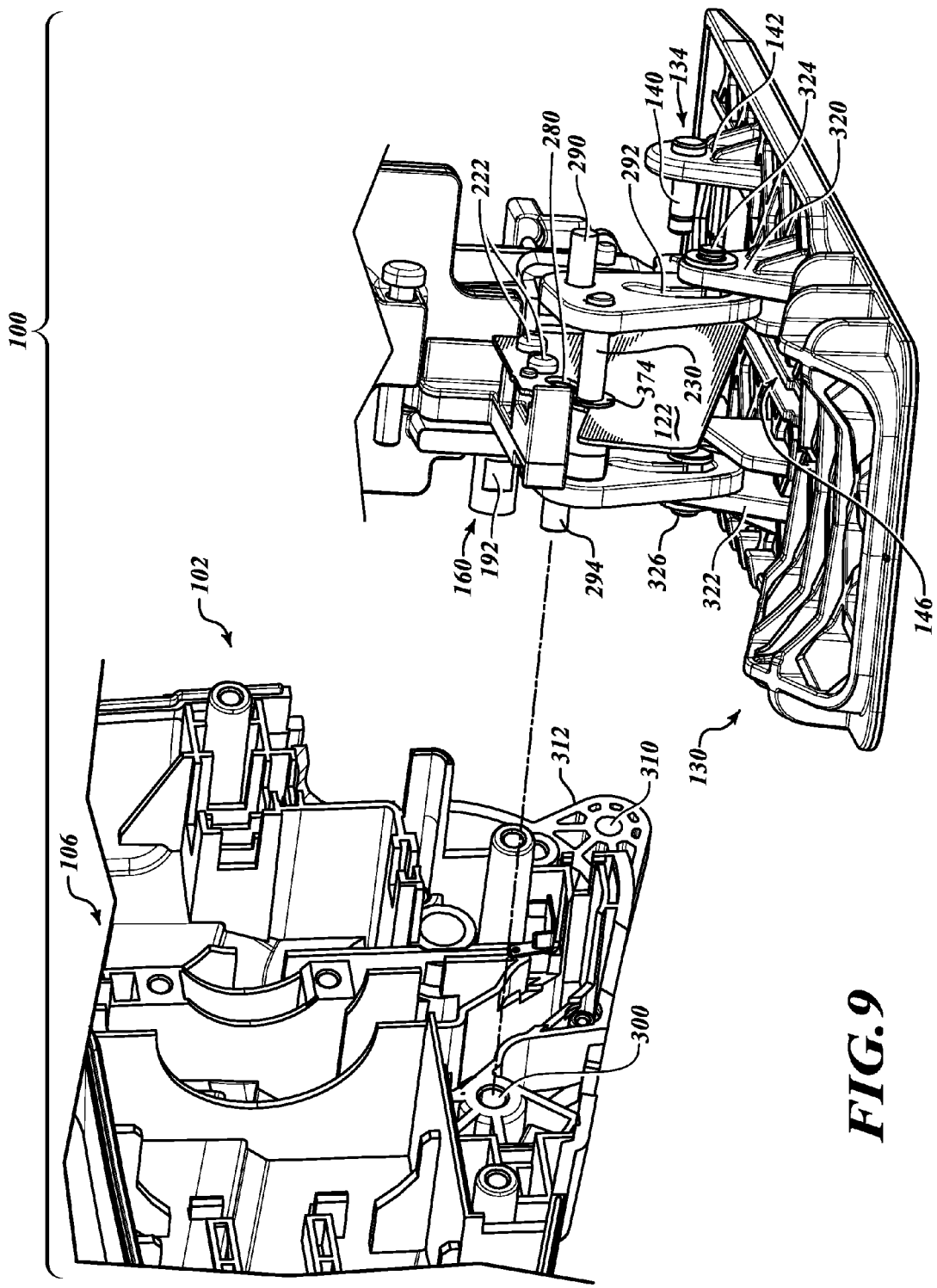
FIG. 9 is a rear partial perspective view of the shoe member in the curve-cutting mode adjacent to a portion of the interior of the housing in accordance with the present teachings.
Figure 10:
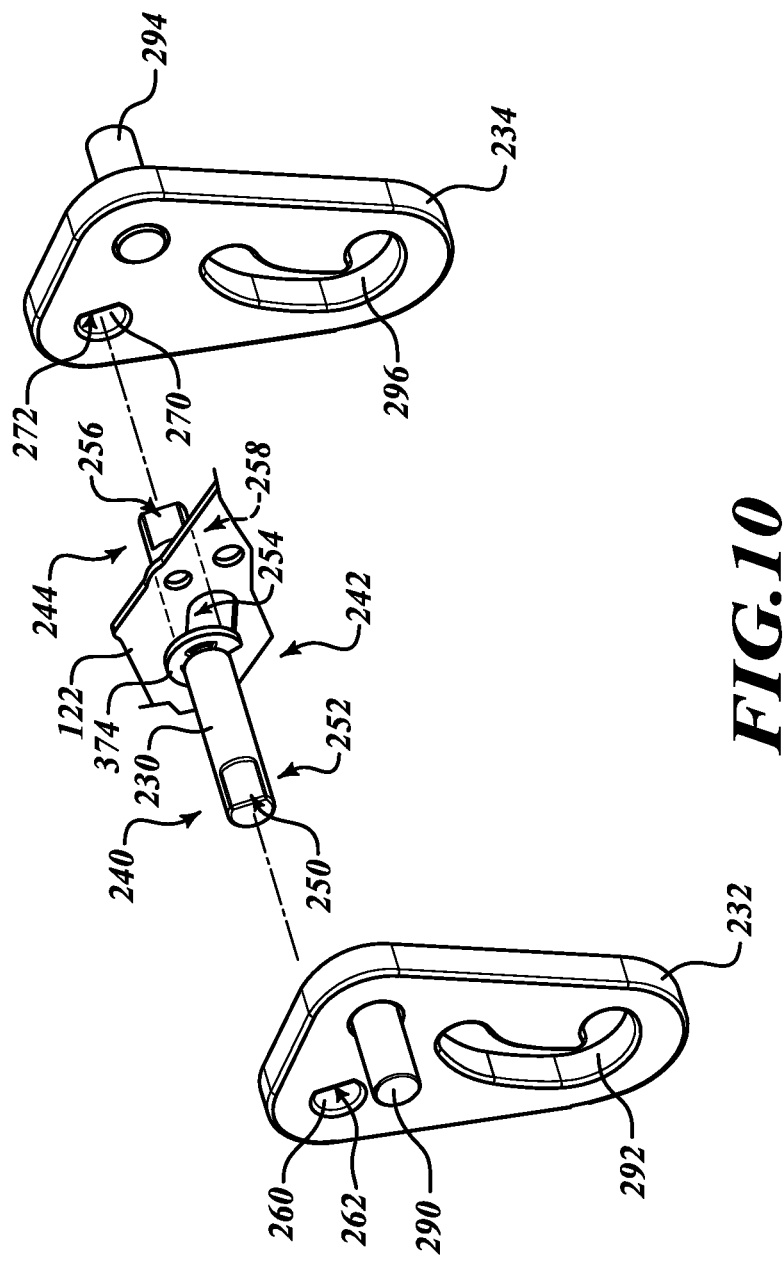
FIG. 10 is a partial exploded assembly view showing cam members and the pins that permit connection to the rack member and housing in accordance with the present teachings.

With reference to FIG. 9, the housing 102 can also form a recess 310 in an extension portion 312 that can extend toward a guard member 314 (FIGS. 1 and 2). The recess 310 on the half-shell 106 and its complementary recess on the opposite half-shell 104 (not specifically shown) can accept the pins 140 that can connect the connectors 142 of the shoe member 130 to the housing 102. The extension portion 312, the connecters 142 and the pins 140 can cooperate to form the pivot 134 and permit the shoe member 130 to pivot relative to the housing 102 between its extended position and retracted position.

The shoe member 130 can define a first connector portion 320 and a second connector portion 322. The first connector portion 320 can connect to the first cam member 232 with a first pin member 324. The second connector portion 322 on the shoe member 130 can connect to the second cam member 234 with a second pin member 326. The first pin member 324 can be secured to the first cam member 232 and the second pin member 326 can be secured to the second cam member 234 with clips or other suitable fasteners or both. The first pin member 324 can travel in the first channel 292 of the first cam member 232. Similarly, the second pin member 326 can travel in the second channel 296 on the second cam member 234. It will be appreciated in light of the disclosure that the first cam member 232 can be connected for rotation with and rotate relative to the body portion 220 of the rack member 170, the housing 102, the keel 122, and the shoe member 130. Similarly, the second cam member 234 can be connected for rotation with and rotate relative to the housing 102, the keel 122, the body portion 220 of the rack member 170, and the shoe member 130.

By rotating the control member 120 to the straight-cutting position, the pinion 162 on the shaft member 160 can draw the rack member 170 (and thus, its body portion 220) into its lowered position to thereby rotate the first and the second cam members 232, 234 in a counterclockwise direction (relative to the view shown in FIG. 5). This draws the shoe member 130 upward into its retracted position.

By rotating the control member 120 to the curve-cutting position, the pinion 162 on the shaft member 160 can cause the rack member 170 to move to its raised position (shown in FIG. 5). In doing so, the pin member 230 that connects the first and second cam members 232, 234 to the body portion 220 of the rack member 170, can be drawn upward and can cause the first and second cam members 232, 234 to rotate in the clockwise direction (i.e., the clockwise direction when viewed from the frame of reference of FIG. 5). This causes the pin members 324, 326 to travel downward in the first and second channels 292, 296, respectively. As a result, the shoe member 130 is urged into its extended position, and forms the acute angle 152 about the pivot 134 with the housing 102.

With reference to FIGS. 13, 14, and 15, a clip member 330 can be formed on (or contained in) the exterior of the housing 102 of the jigsaw 100. A magnetic member 332 can be formed on the shoe member 130. When the shoe member 130 is drawn toward the housing 102 into its retracted position, the magnetic member 332 on the shoe member 130 can be releasably coupled to the clip member 330 on the housing 102. The user can move the control member 120 from the straight-cutting position to the curve-cutting position and defeat the attraction of the magnetic member 332 to the clip member 330 and move the shoe member 130 away from the housing 102 into its extended position.

As described above, the drive member 210 and the bell crank 202 can cooperate to impart orbital motion to the cutting blade 114 in the straight-cutting position. In the curve-cutting position, the single control member 120 can be rotated so that the circular contour of the shaft member 160 contacts the flange 200 formed on the bell crank 202. In doing so, the bell crank 202 can be held at any of one or more predetermined distances away from the driver member 210. By way of the above example, the single control member 120 can be positioned so that the bell crank 202 can be held sufficiently far from the driver member 210 so that the driver member 210 does not contact the bell crank 202 at any point during the movement of the driver member 210. In this regard, no orbital motion is imparted to the cutting blade 114 (i.e., the magnitude of orbital motion is zero).

In some embodiments, the control member 120 could be positioned to reduce orbital magnitude in lieu of removing orbital motion altogether. In such embodiments, the shaft member 160 could be formed with one or more cam features, eccentric portions, flat surfaces and/or other features that may interact with the flange 200 to vary the amount of contact that the drive member 210 is allowed to make with the bell crank 202, thereby varying the magnitude of orbital motion. Additionally or alternatively, the shaft member 160 could be configured to allow a non-zero magnitude of orbital motion in the curve-cutting mode.

Figure 7:
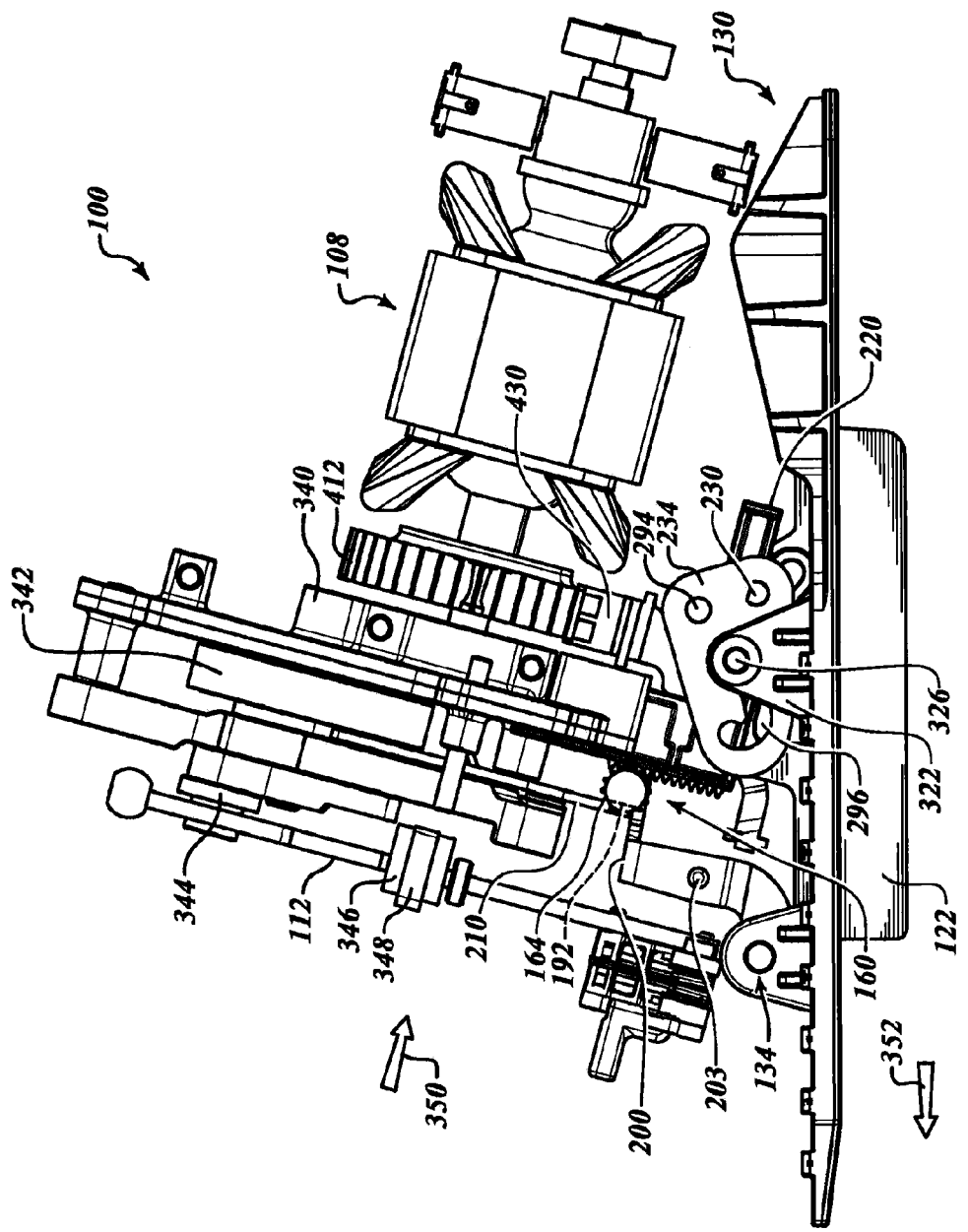
FIG. 7 is similar to FIG. 4 and shows another partial side view of the jigsaw in the straight-cutting mode with a reciprocating shaft forming an acute angle with the shoe member in accordance with the present teachings.

With reference to FIG. 7, the motor 108 can attach to a motor block 340 that can hold an eccentric mechanism 342. The reciprocating shaft 112 and the driver member 210 can be contained within the housing 102 and can be restrained so that the eccentric mechanism 342 is able to convert the rotational output of the motor 108 into the reciprocating motion of the reciprocating shaft 112 or the driver member 210, or both. The reciprocating shaft 112, however, can pivot between a forward position and a backward position within the housing 102, which can, in turn, facilitate the orbital motion of the cutting blade 114.

More specifically, the reciprocating shaft 112 can travel between a top bearing member 344 and a bottom bearing member 346. The top bearing member 344 can be configured to permit the reciprocating shaft 112 to pivot about the top bearing member 344. The bottom bearing member 346 can include an elastic member 348 that can bias the reciprocating shaft 112 in a direction 350 that can be opposite a cutting direction 352, when the bottom bearing member 346 is contained in the housing 102. The reciprocating shaft 112 can, therefore, be permitted to pivot about the top bearing member 344, while the reciprocating shaft 112 can be urged in a direction against the bias of the elastic member 348 that is in (or connected to) the bottom bearing member 302.

In various aspects of the present teachings, the orbital motion can draw the cutting blade 114 closer to a cutting area 360 (FIG. 2) of the workpiece 148 as the cutting blade 114 is drawn upward in its reciprocating motion. As the cutting blade 114 is pushed downward, the elastic member 348 in the bottom bearing member 346 can push the cutting blade 114 toward the direction 350 and further from the cutting area 360. By urging the cutting blade 114 away from the cutting area 360 on the downward stroke, the cutting blade 114 can be shown to clear debris, etc. from the cutting area 360. On the upstroke, the driver member 210 can contact the bell crank 202 to again urge the cutting blade 114 to re-engage and cut the workpiece 148. It will be appreciated in light of this disclosure that the cutting blade 114 can be configured to cut on the up-stroke. In other examples, the cutting blade 114 can be configured to cut on the down-stroke and the magnitude of orbital motion in combination with the reciprocation speed of the cutting blade 114 of the jigsaw 100 can be configured accordingly.

Figure 8:
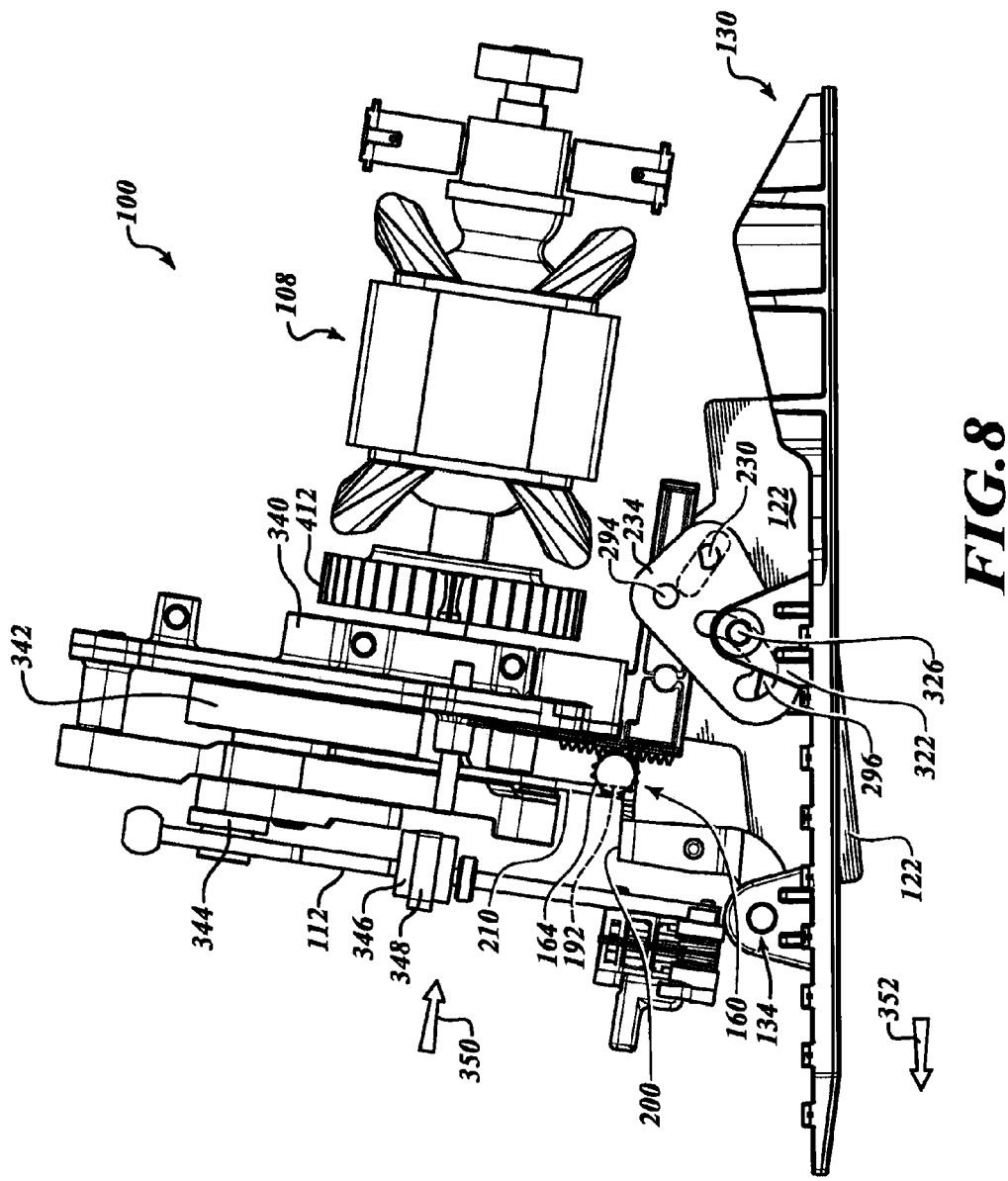
FIG. 8 is similar to FIG. 7 and shows another partial side view of its jigsaw in an intermediate position between the straight-cutting mode and the curve-cutting mode in accordance with the present teachings.

With reference to FIGS. 5 and 8, the keel 122 can be attached to the body portion 220 of the rack member 170 with the multitude of fasteners 222. The fasteners 222 can permit the keel 122 to move relatively slightly in a lateral direction relative to the cutting direction 352 of the jigsaw 100. The fasteners 222 can restrict the front-to-back motion (i.e., a direction generally parallel to the cutting direction 352) but can permit the keel 122 to move laterally (i.e., a direction generally perpendicular to the cutting direction 352). In this arrangement, the keel 122 can rock or float from side-to-side. It can be shown that the ability of the keel 122 to float from side-to-side can permit the user to more easily cut in a straight line with the jigsaw 100 and make corrections to a cutting line during a straight-cutting operation.

Figure 20:
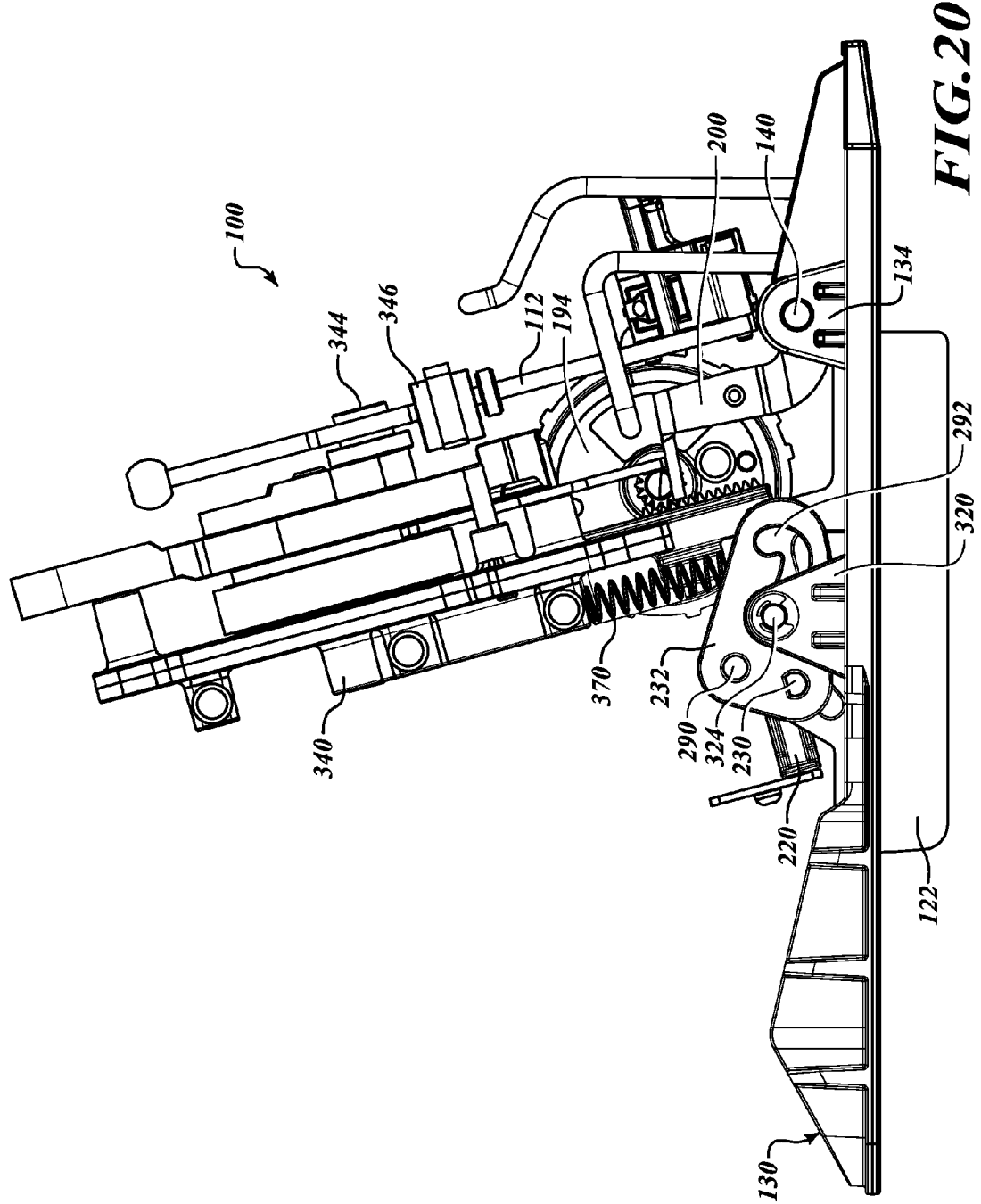
FIG. 20 is a simplified side view of the jigsaw showing an elastic member disposed above the keel member in accordance with the present teachings.

With reference to FIGS. 20 and 21, an elastic member 370 can be secured between the motor block 340 and a top surface of the keel 122 and the body portion 220 of the rack member 170. The elastic member 370 can take the form of a spring. The elastic member 370 can urge the rack member 170 downward to facilitate moving the keel 122 to the deployed position. In addition, the elastic member 370 can urge the keel 122 to align itself when cutting through the workpiece 148. Because the keel 122 is able to move about the fasteners 370, the keel 122 can be shown to rely on vibrations produced by the motor 108 in an urging force produced by the elastic member 370 to align itself when cutting through the workpiece 148. Because of the play between the rack member 170 and the motor block 340, the keel 122 can be shown to float during cutting operations. The spring force applied by the elastic member can therefore center the keel 122 in a lateral direction relative to the cutting blade 114 and, in turn, permit the keel 122 to be initially guided into the workpiece 148.

With reference to FIGS. 9, 10, 20, and 21, a clip 374 can be secured over the pin member 254 and against the keel 122. The clip 374 can be elastic and can exert a force against an aft portion of the keel 122. It can be shown that the clip 374 can prevent the keel 122 from translating past a center point to keep the keel 122 aligned for relatively easy entry into the workpiece 148. Furthermore, the clip 374 can add rigidity to the aft portion of the keel 122 and restrict the aft portion keel 122 from "fishtailing" or floating beyond a desirable amount. The elastic clip 374, the elastic member 370 and/or manufacturing tolerances can cooperate to align the keel 122 relative to the blade 114, while allowing the blade 114 to float a desired amount from side-to-side. In some embodiments, a desirable amount of float may be about one millimeter in both directions from center, or between about one-half of a millimeter and two millimeters in both directions from center. It will be appreciated that the jigsaw 100 could be configured for more or less float of the keel 122, and in some embodiments, the keel 122 could be substantially laterally rigid. In some embodiments, the elastic member 370 can be used with or without the elastic clip 374 and the clip 374 can be used with or without the elastic member 370 to keep the keel 122 centered relative to the cutting blade 114 during operations. As such, the elastic member 370 can be configured to exert a force on the rack member 170 in a direction that can be transverse to a direction by which the elastic clip 374 can be configured to exert a force on the keel 122.

With reference to FIGS. 11 and 12, the jigsaw 100 can include a light source, such as a light-emitting diode (LED) or a laser light source, for example, that can selectively produce a wide-area illumination pattern 380 and a straight-line illumination pattern 382. The light source may produce the wide-area illumination pattern 380 when the jigsaw 100 is in the curve-cutting mode and can be shown to provide illumination for the path of the jigsaw 100 as various curved-cuts are performed on the workpiece. The light source can provide the straight-line illumination pattern 382 when the jigsaw is in the straight-cutting mode. The straight-line illumination pattern 382 can be projected as a solid line. The straight-line illumination pattern 382 can also be implemented in a multitude of dashes, dots, or both. The straight-line illumination pattern 382 can provide a projected cutting path for the jigsaw 100 when the keel 122 is in its extended position and the jigsaw 100 is in the straight-cutting mode.

One or more sensors can be placed in the jigsaw 100 to detect the position of one or more parts of the jigsaw 100 to switch between the wide-area illumination pattern 380 (FIG. 11) and the straight-line illumination pattern 382 (FIG. 12) as the jigsaw 100 is switched between the curve-cutting mode and straight-cutting mode, respectively. In one example, a sensor 390 can be placed in contact with one or more components of the control member 120. In this example, the sensor 390 can take the form of a momentary switch. In other examples, one or more sensors can be placed to detect the position of the shoe member 130 as it moves between its retracted position and its extended position. In further examples, two sensors can be employed to apply the wide-area illumination pattern 380 and the straight-line illumination pattern 382. The two sensors can take the form of two switches, where one switch can be employed with (or be a part of) the trigger assembly 110. The other of the two switches can be employed with the control member 120 to detect either the curve-cutting position or the straight-cutting position. In doing so, the trigger assembly 110 can cause the illumination pattern to be activated and the position of the control member 120 can be used to select between the wide-area illumination pattern 380 to the straight-line illumination pattern 382. The trigger assembly 110 can extinguish the illumination pattern, regardless of the position of the control member 120.

In further examples, the wide-area illumination pattern 380 can be produced from an ultraviolet light source. The wide-area illumination pattern 380 can also be produced from one or more light-emitting diodes, incandescent bulbs, fluorescent tubes, or combinations thereof. In the straight-cutting mode, the straight-line illumination pattern 382 can be produced from a laser source contained with the housing 102. The straight-line illumination pattern 382 can also be produced from a focused light source contained with the housing 102 such as one or more light-emitting diodes, incandescent bulbs, fluorescent tubes, or combinations thereof.

In some embodiments, the control member 120 can also control the reciprocation speed of the jigsaw 100. For example, the control member 120 can be in communication with a potentiometer (not shown) configured to vary the speed of the motor 108, or the motor 108 and control member 120 could be in communication with a variable speed switch that is configured to vary the speed of the motor 108. The jigsaw 100 in the straight-cutting mode can be implemented with a maximum reciprocation speed. In contrast, the control member 120 can be moved to implement the curve-cutting mode, where the maximum reciprocation speed is reduced. In examples where the trigger assembly 110 can drive the motor 108 at varying speeds by selectively manipulating the trigger assembly 110, the jigsaw 100 can permit maximum reciprocation speed in the straight-cutting mode, while reducing reciprocation speed in curve-cutting mode.

When the jigsaw 100 is implemented in the straight-cutting mode, the keel 122 can be deployed to its extended position that is below the shoe member 130. In this arrangement, a handle 400 of the jigsaw 100 can be deployed in a position that can be similar to a handle position of a circular saw, as shown in FIG. 2. The position of the handle 400 in the straight-cutting mode can be shown to provide the user with more straight-line stability. In contrast, the handle 400 of the jigsaw can be provided in a relatively more upright position in the curve-cutting mode, as shown in FIG. 1. In the curve-cutting mode, the position of the handle 400 can be shown to permit the user to more easily direct the cutting blade 114 of the jigsaw 100 into more complex curves.

The internal construction of the housing 102 of the jigsaw 100 can include an airflow path 410 formed between the motor 108 and the cutting area 360 (FIG. 16) adjacent the cutting blade 114. The airflow generated by a fan 412 connected to the motor 108 to cool the motor 108 can also at least partially be directed toward the cutting blade 114. In doing so, the airflow can be pushed over the cutting area 360 and can be shown to clear debris from in front of the cutting blade 114 and in and around the cutting area 360.

With reference to FIGS. 16-19, the airflow path 410 can be formed in the housing 102 and can extend from the motor 108 to the cutting area 360. The airflow path 410 can define a first pathway 420 and a second pathway 422 that can be formed on opposite sides of the motor 108. Initially, the airflow path 410 can include ducts 430 adjacent the motor 108 that can direct airflow from the motor 108 into each of the airflow pathways 420, 422. The ducts 430 can include multiple fins 432 that can direct the airflow from the fan 412. From the ducts 430, the airflow path 410 can extend through the housing 102 from opposite sides of the motor 108 and ultimately toward the cutting area 360. The housing half-shells 104, 106 can each cooperate to form the airflow path 410 with a pathway member 440. The pathway member 440 can connect to the ducts 430 and can terminate at a window 442 formed adjacent the cutting area 360. In this example, the housing half-shell 104 can cooperate with the pathway member 440 to form the airflow path 410 having a rectangular cross-section. The housing half-shell 106 can form a similar structure on an opposite side of the motor 108 with a pathway member (not shown). As such, the first airflow pathway 420 can terminate at the window 442 and the other airflow pathway 422 can terminate at a window 444 formed adjacent the cutting area 360 to exhaust airflow from the motor 108 to the cutting area 360.

The foregoing description of the aspects of the present teachings has been provided for purposes of illustration and description. It is not intended to be exhaustive or to limit the disclosure. Individual elements or features of a particular aspect are generally not limited to that particular aspect, but, where applicable, are interchangeable and can be used in a selected aspect, even if not specifically shown or described. The same may also be varied in many ways. Such variations are not to be regarded as a departure from the disclosure, and all such modifications are intended to be included within the scope of the disclosure. In some example aspects, well-known processes, well-known device structures, and well-known technologies are not described in detail.

The terminology used herein is for the purpose of describing particular example aspects of the present teachings only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A jigsaw comprising: a housing containing a motor and including a handle; a control member supported by the housing and moveable between at least a first position that defines a first mode and a second position that defines a second mode; a shoe member connected to the housing and including a bottom surface facing away from the housing; and a keel assembly movably connected to the housing and including a keel member, the keel assembly being connected to the control member by a mechanism that moves the keel assembly relative to the housing and the shoe member into a deployed configuration in which the keel member protrudes through the bottom surface of the shoe member in response to movement of the control member into the second position, and the mechanism moves the keel assembly relative to the housing and the shoe member into a stowed configuration in which the keel member does not protrude through the bottom surface of the shoe member in response to movement of the control member into the first position.

2. The jigsaw of claim 1, wherein the mechanism is coupled to the shoe member to pivot the shoe member relative to the housing and the keel member between an extended position and a retracted position in response to the control member moving between the first and second positions, respectively.

3. The jigsaw of claim 1, further comprising a reciprocating shaft movably supported in the housing and driven by the motor, the reciprocating shaft is operable to move the cutting blade at a reciprocation speed and at a magnitude of orbital motion when the motor is receiving electrical power, and the control member controls the magnitude of the orbital motion and the reciprocation speed.

4. The jigsaw of claim 1, wherein the control member includes a handle accessible from an exterior of the housing that is rotatable between at least the first position and the second position.

5. The jigsaw of claim 1, wherein the control member includes a pinion shaft rotatably supported by the housing and engaging a rack member, wherein rotation of the pinion shaft is converted to linear movement of the rack member to actuate the relative movement of the keel and the shoe member.

6. The jigsaw of claim 1, wherein the mechanism includes a cam member that connects the keel assembly and the shoe member so that movement of the keel assembly produces a countermotion in the shoe member.

7. The jigsaw of claim 6, wherein the cam member is connected for rotation relative to the housing, the shoe member, and the keel member, wherein the shoe member includes a connector portion and a pin member, the pin member extends from the connector portion and extends through a channel formed in the cam member, the pin member is operable to travel in the channel of the cam member when the control member is moved between the first position and the second position.

8. The jigsaw of claim 1, wherein the shoe member is pivotable relative to the housing and the keel member between an extended position and a retracted position, and wherein the shoe member includes a magnetic member and the housing includes a clip member, the magnetic member is releaseably connected to the clip member when the shoe member is in the retracted position.

9. The jigsaw of claim 1, wherein the keel member is connected to a rack member with an elastic clip and an elastic member is disposed between a motor block in the housing and the rack member, the elastic member is configured to exert a force on the rack member in a direction that is transverse to a direction by which the elastic clip is configured to exert a force on the keel member.

10. The jigsaw of claim 1 further comprising a cutting blade drivingly engaged by the motor and wherein the first mode is a curve-cutting mode and the second mode is a straight-cutting mode.

11. A jigsaw comprising: a housing containing a motor activated by a trigger assembly; a control member movably supported by the housing between at least a first position that defines a first mode and a second position that defines a second mode; a keel connected to the housing; and a shoe member pivotally connected to the housing and connected to the control member by a mechanism, the mechanism moving the shoe member relative to the housing and the keel between an extended position and a retracted position in response to movement of the control member between the first and second positions, the shoe member including a bottom surface facing away from the housing and defining a channel through which the keel extends when the shoe member is in the retracted position, the keel being stowed between the bottom surface and at least a portion of the housing when the shoe member is in the extended position.

12. The jigsaw of claim 11, wherein the control member includes a pinion shaft rotatably supported by the housing and connected to a rack member of the mechanism, wherein movement of the rack member causes the shoe member to move between the extended position and the retracted position.

13. The jigsaw of claim 11, wherein the mechanism includes a cam member that connects the keel and the shoe member so that movement of the control member between the first and second positions causes movement of the keel relative to the housing and the shoe member.

14. The jigsaw of claim 13, wherein the cam member is connected for rotation relative to the housing, the shoe member, and the keel, wherein the shoe member includes a connector portion and a pin member, the pin member extends from the connector portion and extends through a channel formed in the cam member, the pin member is operable to travel in the channel of the cam member when the control member is moved between the first position and the second position.

15. The jigsaw of claim 13 further comprising a reciprocating shaft movably supported in the housing and driven by the motor, the reciprocating shaft is operable to move at a reciprocation speed and at a magnitude of orbital motion when motor is receiving electrical power, and wherein movement of the control member controls the magnitude of the orbital motion and the reciprocation speed.

16. The jigsaw of claim 11 further comprising a cutting blade drivingly engaged by the motor and wherein the first mode is a curve-cutting mode and the second mode is a straight-cutting mode.

\* \* \* \* \*